US012432726B2

(12) United States Patent
Tsai et al.

(10) Patent No.: US 12,432,726 B2
(45) Date of Patent: Sep. 30, 2025

(54) APPARATUS FOR PERFORMING MULTI-PANEL TRANSMISSION FOR NEW RADIO VEHICLE TO EVERYTHING

(71) Applicant: InterDigital Patent Holdings, Inc., Wilmington, DE (US)

(72) Inventors: Allan Y. Tsai, Boonton, NJ (US); Patrick Svedman, Stockholm (SE); Yifan Li, Conshohocken, PA (US); Guodong Zhang, Woodbury, NY (US); Lakshmi R. Iyer, King of Prussia, PA (US); Zhuo Chen, Claymont, DE (US); Mohamed Awadin, Plymouth Meeting, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 535 days.

(21) Appl. No.: 17/441,785

(22) PCT Filed: Mar. 27, 2020

(86) PCT No.: PCT/US2020/025304
§ 371 (c)(1),
(2) Date: Sep. 22, 2021

(87) PCT Pub. No.: WO2020/198616
PCT Pub. Date: Oct. 1, 2020

(65) Prior Publication Data
US 2022/0174655 A1 Jun. 2, 2022

Related U.S. Application Data

(60) Provisional application No. 62/825,408, filed on Mar. 28, 2019.

(51) Int. Cl.
*H04W 72/04* (2023.01)
*H04L 5/00* (2006.01)
(Continued)

(52) U.S. Cl.
CPC .......... *H04W 72/20* (2023.01); *H04L 5/0048* (2013.01); *H04W 4/40* (2018.02); *H04W 48/16* (2013.01)

(58) Field of Classification Search
CPC ....... H04W 72/20; H04W 4/40; H04W 48/16; H04L 5/0048; H04L 5/14
(Continued)

(56) References Cited

U.S. PATENT DOCUMENTS 10,075,218 B2   9/2018  Rahman et al.
11,172,468 B2 * 11/2021  Ben-Ari ................... H04L 1/20
(Continued)

FOREIGN PATENT DOCUMENTS

CN         108352967 A     7/2018
WO     WO 2018/064179 A1   4/2018
WO         2019/006085 A1   1/2019

OTHER PUBLICATIONS

"E et al, Device Discovery Method, Device And System, Sep. 14, 2021 CN 111586666" (Year: 2019).*
(Continued)

*Primary Examiner* — Bailor C Hsu
(74) *Attorney, Agent, or Firm* — Flaster Greenberg P.C.

(57) ABSTRACT

A system, apparatus, method, and computer program product used in a new radio (NR) system includes a processor and a memory storing computer-executable instructions that when executed by a processor cause a first user equipment (UE) having a plurality of antenna panels to perform Vehicle-to-Everything (V2X) sidelink (SL) radio communication with a second UE. Systems, apparatuses, methods, and computer program products for performing a discovery procedure in a NR system, for performing a reference signal
(Continued)

communication in a NR system, controlling a timing offset in a NR system, and performing beam management in a NR system are also described.

10 Claims, 27 Drawing Sheets

(51) Int. Cl.
   H04W 4/40         (2018.01)
   H04W 48/16        (2009.01)
   H04W 72/20        (2023.01)
(58) Field of Classification Search
   USPC .......................................................... 370/329
   See application file for complete search history.

(56) References Cited

U.S. PATENT DOCUMENTS

| | | | | |
|---|---|---|---|---|
| 11,323,986 | B2* | 5/2022 | Chiu | H04L 27/2675 |
| 11,601,919 | B2* | 3/2023 | Ye | H04W 4/40 |
| 11,825,560 | B2* | 11/2023 | Panteleev | H04W 72/20 |
| 11,924,128 | B2* | 3/2024 | Cha | H04W 72/21 |
| 11,973,598 | B2* | 4/2024 | Hosseini | H04W 72/044 |
| 2019/0181934 | A1* | 6/2019 | Kang | H04B 7/0478 |
| 2020/0229206 | A1* | 7/2020 | Badic | H04W 52/0209 |
| 2020/0252755 | A1* | 8/2020 | Novlan | H04W 4/06 |
| 2021/0211940 | A1* | 7/2021 | Berg | H04W 28/0226 |
| 2022/0015043 | A1* | 1/2022 | Yoshioka | H04L 1/1825 |
| 2022/0174655 | A1* | 6/2022 | Tsai | H04W 72/20 |
| 2022/0174657 | A1* | 6/2022 | Wang | H04W 72/02 |
| 2023/0117782 | A1* | 4/2023 | Yoon | H04W 72/40 |
| | | | | 370/329 |
| 2023/0354211 | A1* | 11/2023 | Chae | H04W 52/242 |
| 2024/0097827 | A1* | 3/2024 | Lee | H04W 4/08 |

OTHER PUBLICATIONS

"3rd Generation Partnership Project; Technical Specification Group Radio Access Network; Study on evaluation methodology of new Vehicle-to- Everything (V2X) use cases for LTE and NR; (Release 15)", 3GPP Draft; 37885-F20, 3rd Generation Partnership Project (3GPP), Mobile Competence Centre ; 650, Route Des Lucioles ; F-06921 Sophia-Antipolis Cedex ; France Jan. 11, 2019 (Jan. 11, 2019), XP051686976.

Akoum Salam et al: "Robust Beam Management for Mobility in mmWave Systems", 2018 52nd Asilomar Conference on Signals, Systems, and Computers, IEEE, Oct. 28, 2018 (Oct. 28, 2018), pp. 1269-1273, XP033521044.

AT&T: Enhancements on Multi Beam Operation, 3GPP Draft; R1-1901904 Enhancements On Multi-Beam Operation, 3rd Generation Partnership Project (3GPP), Mobile Competence Centre 650 Route Des Lucio Les F-06921 Sophia-Antipolis Cedex; Cedex. Frane RAN WGI, vol. RAN WG1, No. Atherns, Greece; Feb. 25, 2019 Mar. 1, 2019 Feb. 16, 2019.

AT&T: "Physical layer procedures for NR sidelink design", Draft; R1-1901896 Physical Layer Procedures for NR Sidelink Design, 3rd Generation Partnership Project (3GPP), Mobile Competence Centre ; 650, Route Des Lucioles ; F-06921 Sophia-Antipolis Cedex vol. RAN WGI, No. Athens, Greece; Feb. 25, 2019-Mar. 1, 2019 Feb. 16, 2019 (Feb. 16, 2019), XP051599590.

3rd Generation Partnership Project, "Technical Specification Group Radio Access Network; Study on Scenarios and Requirements for Next Generation Access Technologies; (Release 14)", 3GPP TR 38.913 V0.2.0, Feb. 2016, 19 pages.

3rd Generation Partnership Project, "initial View on NR V2X Sidelink Physical Layer Structures and Procedures", Nokia, et al., R1-1809045, 3GPP TSG RAN WG1 Meeting #94, Aug. 8, 2018, 7 pages.

* cited by examiner

APPARATUS FOR PERFORMING MULTI-PANEL TRANSMISSION FOR NEW RADIO VEHICLE TO EVERYTHING

CROSS-REFERENCE TO RELATED APPLICATIONS

The present application is the National Stage Application of International Patent Application No. PCT/US2020/025304, filed Mar. 27, 2020, which claims priority to U.S. Provisional Application No. 62/825,408, filed Mar. 28, 2019, which is incorporated herein by reference in its entirety.

FIELD

The present disclosure relates generally to wireless communications, and more particularly to wireless communications systems, devices, methods, and computer readable medium with multi-panel transmission and sidelink reference signaling (RS) when used for Vehicle to Everything (V2X) communication in NR systems.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vehicular communication services, represented by LTE V2X services may include Vehicle-to-Vehicle (V2V), Vehicle-to-Infrastructure (V2I), Vehicle-to-Network (V2N) and Vehicle-to-Pedestrians (V2P). V2X services can be provided by PC5 interface and/or Uu interface. Support of V2X services via PC5 interface is provided by V2X sidelink communication, which is a mode of communication whereby UEs can communicate with each other directly over the PC5 interface. Conventional LTE V2X sidelink may not effectively support multi-link operation, efficient use of reference signaling, advantageous inter-symbol interference (ISI), or appropriate beam management (BM).

SUMMARY

A system, apparatus, method, and computer program product used in a new radio (NR) system includes a processor and a memory storing computer-executable instructions that when executed by a processor cause a first user equipment (UE) having a plurality of antenna panels to perform Vehicle-to-Everything (V2X) sidelink (SL) radio communication with a second UE. Systems, apparatuses, methods, and computer program products for performing a discovery procedure in a NR system, for performing a reference signal communication in a NR system, controlling a timing offset in a NR system, and performing beam management in a NR system are also described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein.

Figure 1A:
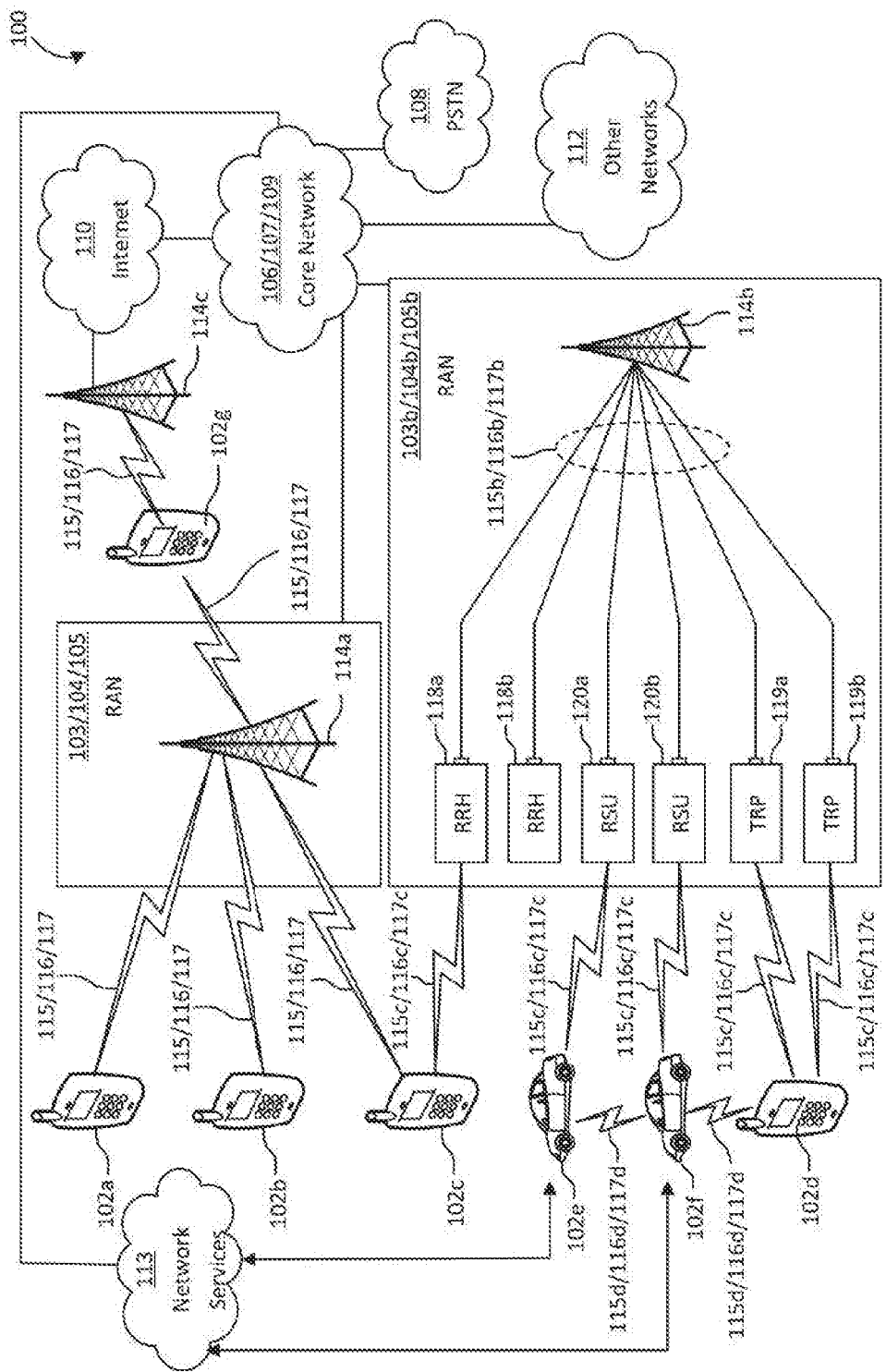
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

FIG. 1A illustrates an example communications system 100 in which the systems, methods, and apparatuses described and claimed herein may be used. The communications system 100 may include wireless transmit/receive units (WTRUs) 102*a*, 102*b*, 102*c*, 102*d*, 102*e*, 102*f*, and/or 102*g*, which generally or collectively may be referred to as WTRU 102 or WTRUs 102. The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114*a* and a base station 114*b*. In the example of FIG. 1A, each base stations 114*a* and 114*b* is depicted as a single element. In practice, the base stations 114*a* and 114*b* may include any number of interconnected base stations and/or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, and/or the other networks 112. Similarly, base station 114*b* may be any type of device configured to wiredly and/or wirelessly interface with at least one of the Remote Radio Heads (RRHs) 118*a*, 118*b*, Transmission and Reception Points (TRPs) 119*a*, 119*b*, and/or Roadside Units (RSUs) 120*a* and 120*b* to facilitate access to one or more communication networks, such as the core network 106/107/109, the Internet 110, other networks 112, and/or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, and/or other networks 112.

TRPs 119*a*, 119*b* may be any type of device configured to wirelessly interface with at least one of the WTRU 102*d*, to facilitate access to one or more communication networks, such as the core network 106/107/109, the Internet 110, Network Services 113, and/or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, and/or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations and/or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations and/or network elements (not shown), such as a BSC, a RNC, relay nodes, etc. The base station 114*a* may be configured to transmit and/or receive wireless signals within a particular geographic region, which may be referred to as a cell (not shown). Similarly, the base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, for example, the base station 114*a* may include three transceivers, e.g., one for each sector of the cell. The base station 114*a* may employ Multiple-Input Multiple Output (MIMO) technology and, therefore, may utilize multiple transceivers for each sector of the cell, for instance.

The base station 114*a* may communicate with one or more of the WTRUs 102*a*, 102*b*, 102*c*, and 102*g* over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114*b* may communicate with one or more of the RRHs 118*a* and 118*b*, TRPs 119*a* and 119*b*, and/or RSUs 120*a* and 120*b*, over a wired or air interface 115*b*/116*b*/117*b*, which may be any suitable wired (e.g., cable, optical fiber, etc.) or wireless communication link (e.g., RF, microwave, IR, UV, visible light, cmWave, mmWave, etc.). The air interface 115*b*/116*b*/117*b* may be established using any suitable RAT.

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., RF, microwave, IR, ultraviolet UV, visible light, cmWave, mmWave, etc.) The air interface 115*c*/116*c*/117*c* may be established using any suitable RAT.

The WTRUs 102 may communicate with one another over a direct air interface 115*d*/116*d*/117*d*, such as Sidelink communication which may be any suitable wireless communication link (e.g., RF, microwave, IR, ultraviolet UV, visible light, cmWave, mmWave, etc.) The air interface 115*d*/116*d*/117*d* may be established using any suitable RAT.

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and/or RSUs 120*a* and 120*b* in the RAN 103*b*/104*b*/105*b* and the WTRUs 102*c*, 102*d*, 102*e*, and 102*f*, may implement a radio technology such as Universal Mobile Telecommunications System (UMTS) Terrestrial Radio Access (UTRA), which may establish the air interface 115/116/117 and/or 115*c*/116*c*/117*c* respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114*a* in the RAN 103/104/105 and the WTRUs 102*a*, 102*b*, 102*c*, and 102*g*, or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A), for example. The air interface 115/116/117 or 115*c*/116*c*/117*c* may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114*a* in the RAN 103/104/105 and the WTRUs 102*a*, 102*b*, 102*c*, and 102*g* or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, 102*e*, and 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114*c* and the WTRUs 102, e.g., WTRU 102*e*, may implement a radio technology such as IEEE 802.11 to establish a Wireless Local Area Network (WLAN). Similarly, the base station 114*c* and the WTRUs 102, e.g., WTRU 102*d*, may implement a radio technology such as IEEE 802.15 to establish a wireless personal area network (WPAN). The base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network.

For example, the ideas that apply to the wireless interfaces 115, 116, 117 and 115c/116c/117c may equally apply to a wired connection.

Figure 1B:
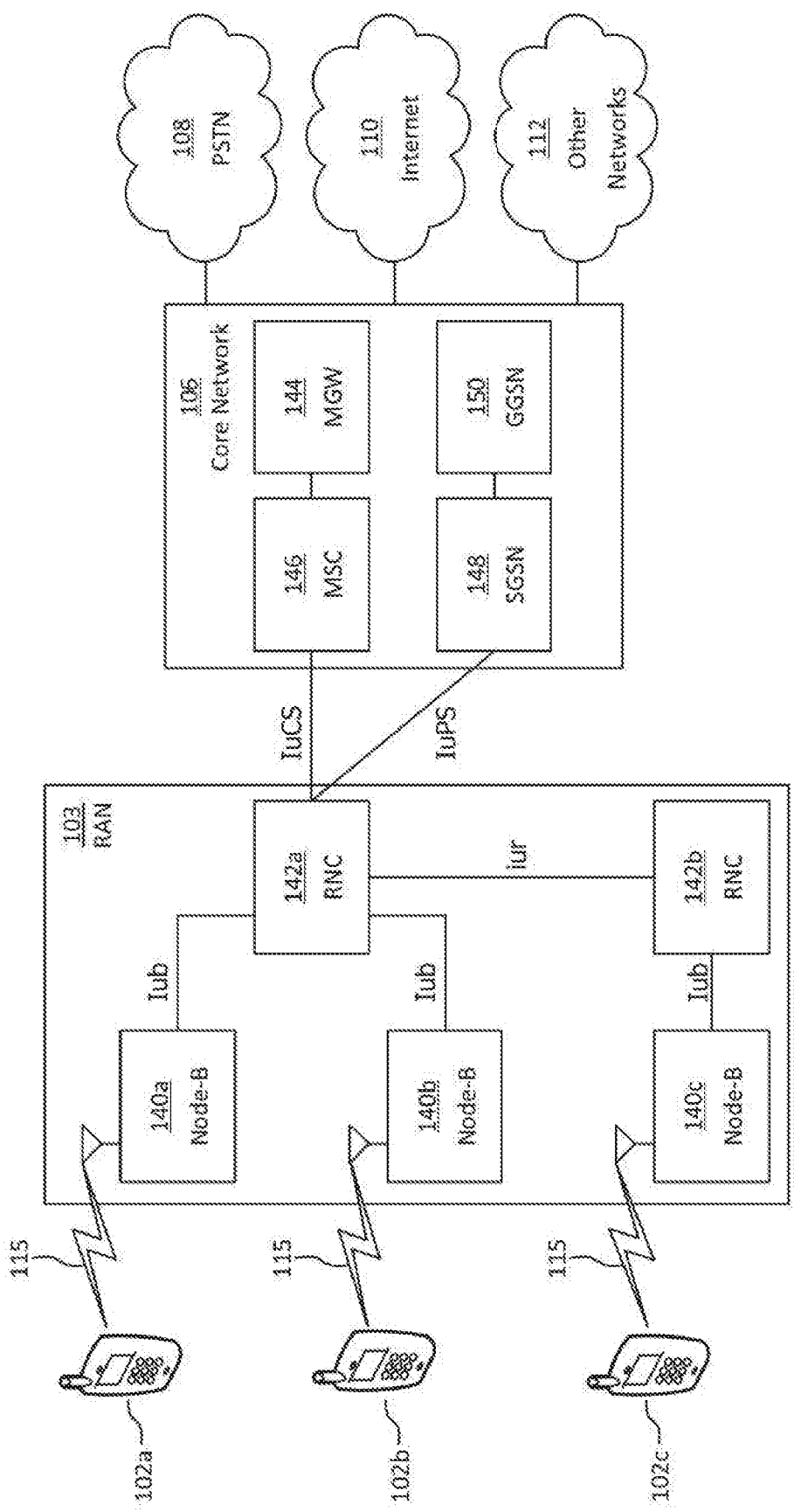
FIG. 1B is a system diagram that shows an example of a Radio Access Network (RAN) architecture and a core network architecture.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
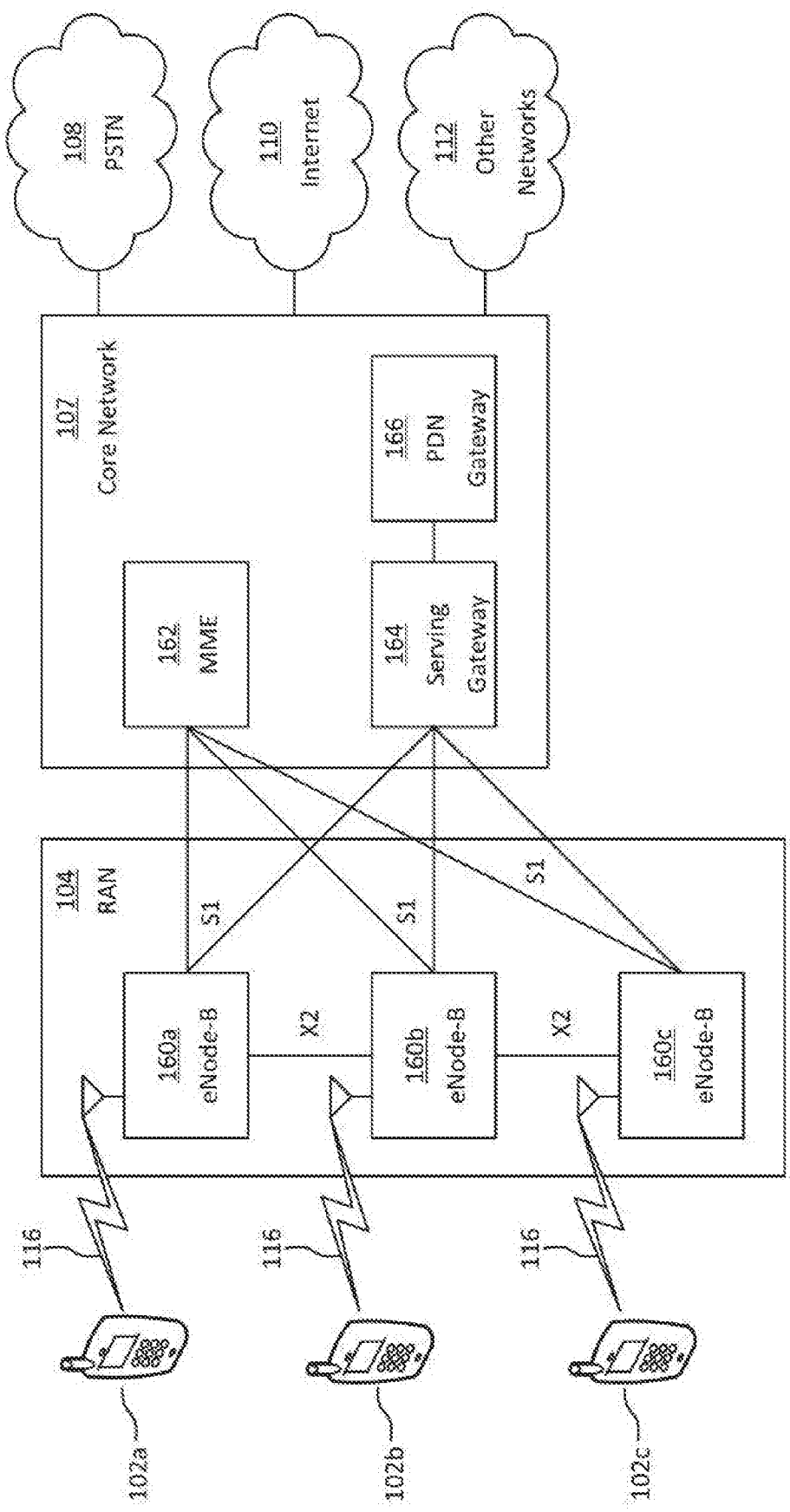
FIG. 1C is a system diagram that shows an example of a Radio Access Network (RAN) architecture and a core network architecture.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
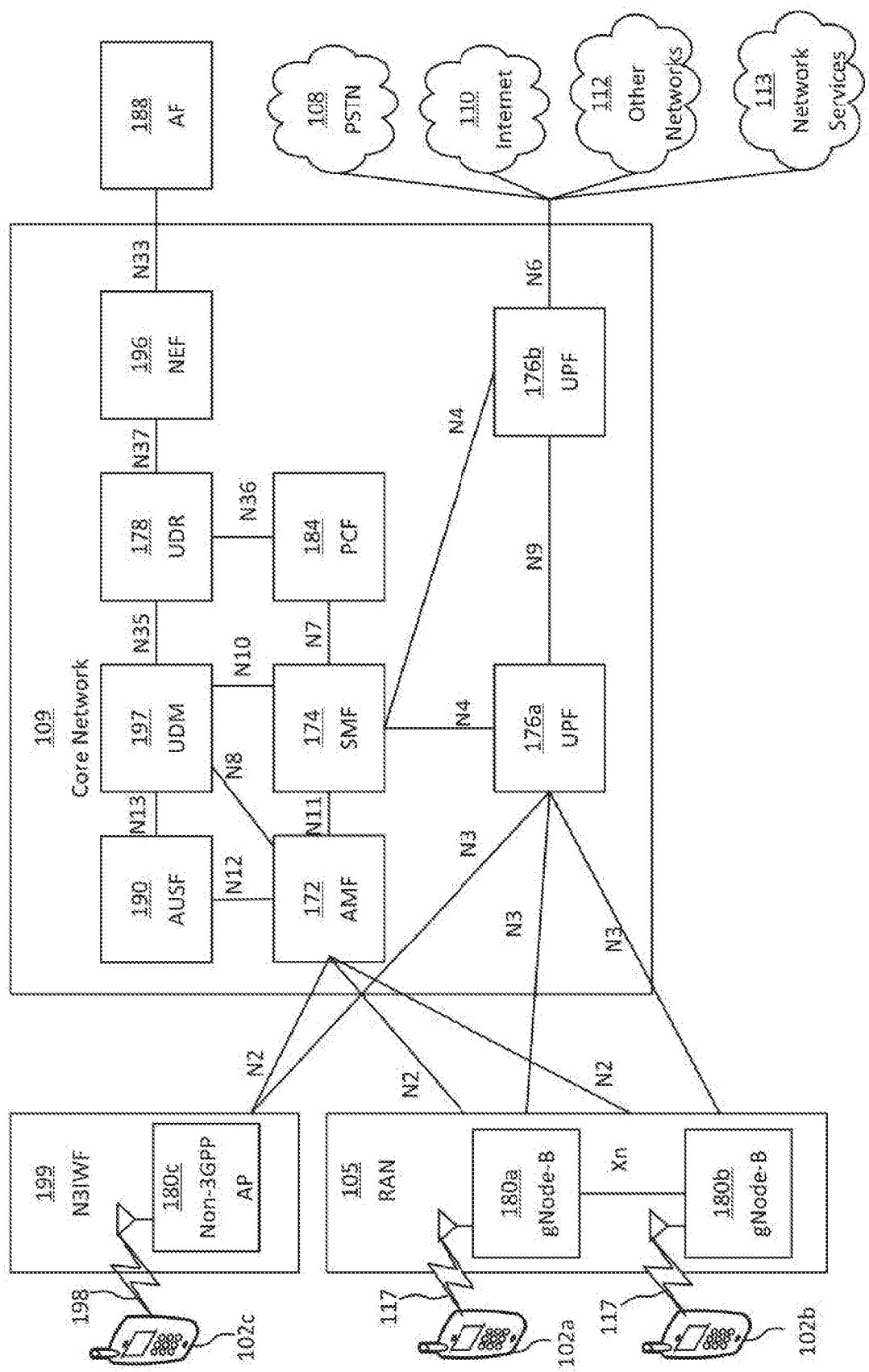
FIG. 1D is a system diagram that shows an example of a Radio Access Network (RAN) architecture and a core network architecture.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting to a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
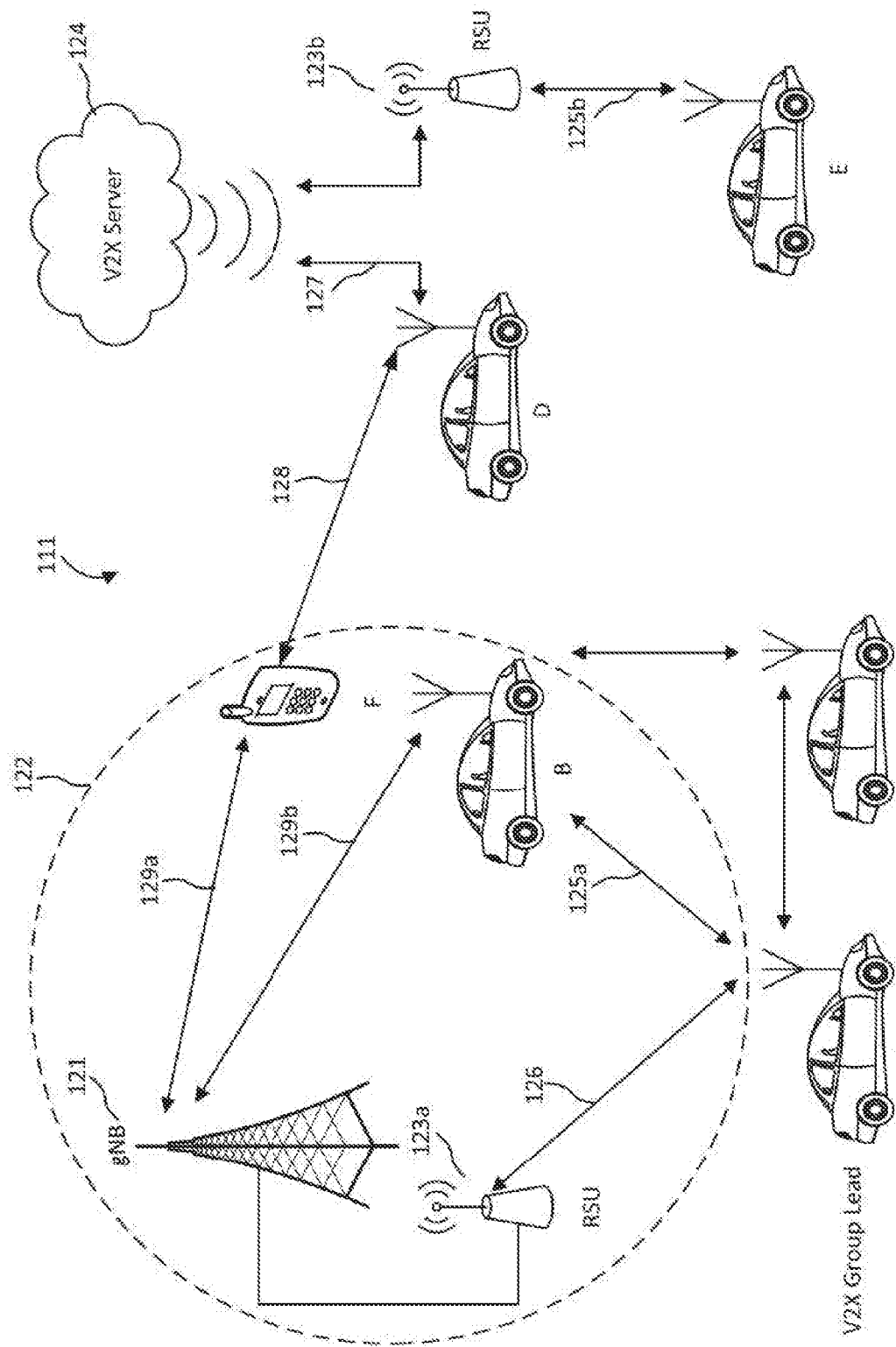
FIG. 1E is a system diagram that shows an example 3GPP architecture.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 122. WTRUs A, B, and C form a V2X group, among which WTRU A is the group lead and WTRUs B and C are group members.

WTRUs A, B, C, D, E, F may communicate with each other over a Uu interface 129b via the gNB 121 if they are under the access network coverage (only B and F are shown under the network coverage in FIG. 1E). WTRUs A, B, C, D, E, F may communicate with each other directly via a Sidelink (PC5 or NR PC5) interface 125 a, 125b, 128, if they are under or out of the access network coverage (e.g., A, C, WTRUs A, B, C, D, E, F may communicate with each other D and E are shown out of the network coverage in FIG. 1E).

WTRUs A, B, C, D, E, and F may communicate with RSU 123a or 123b via a Vehicle-to-Network (V2N) 126 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
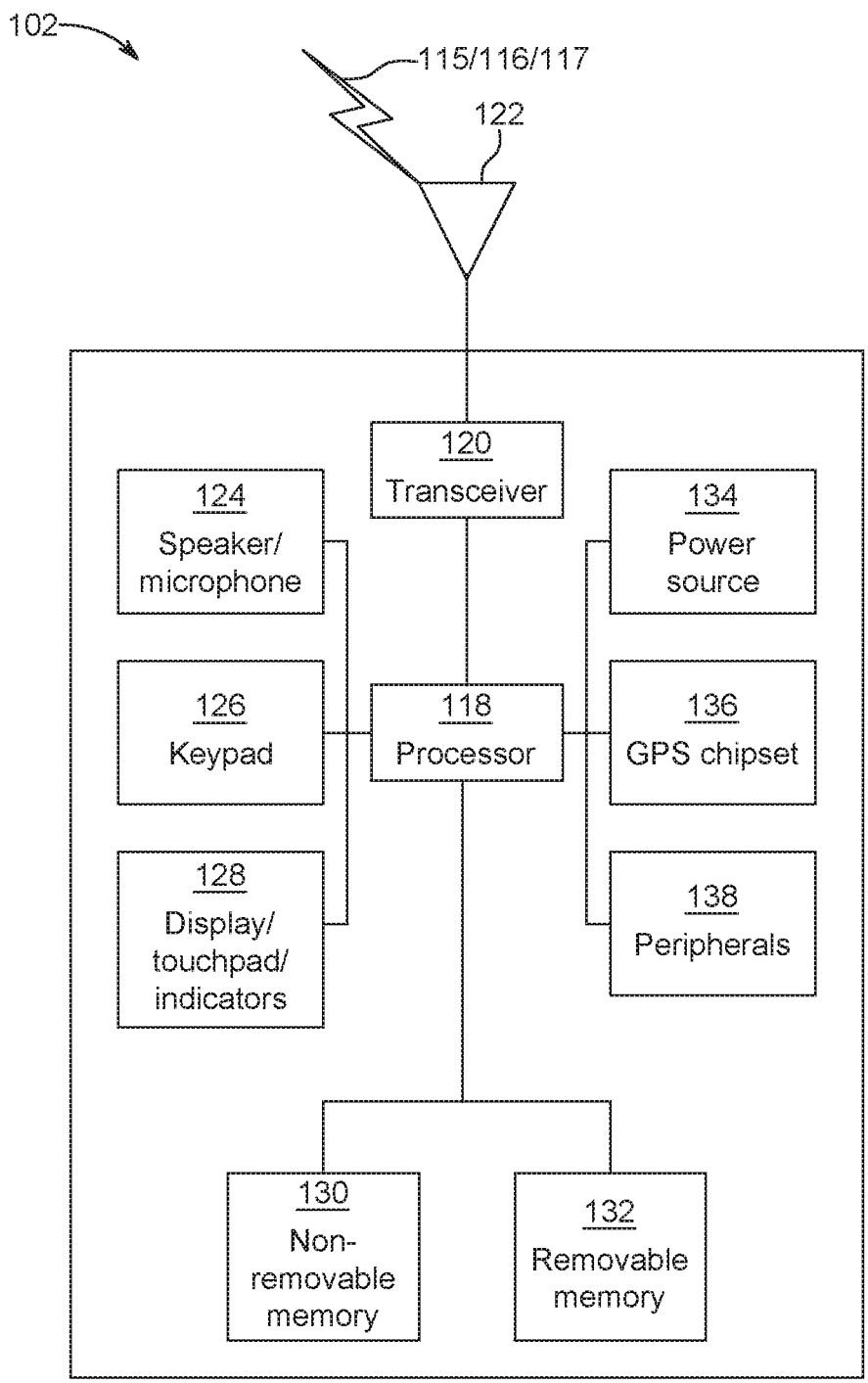
FIG. 1F is a system diagram of an example apparatus or device configured for wireless communications.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
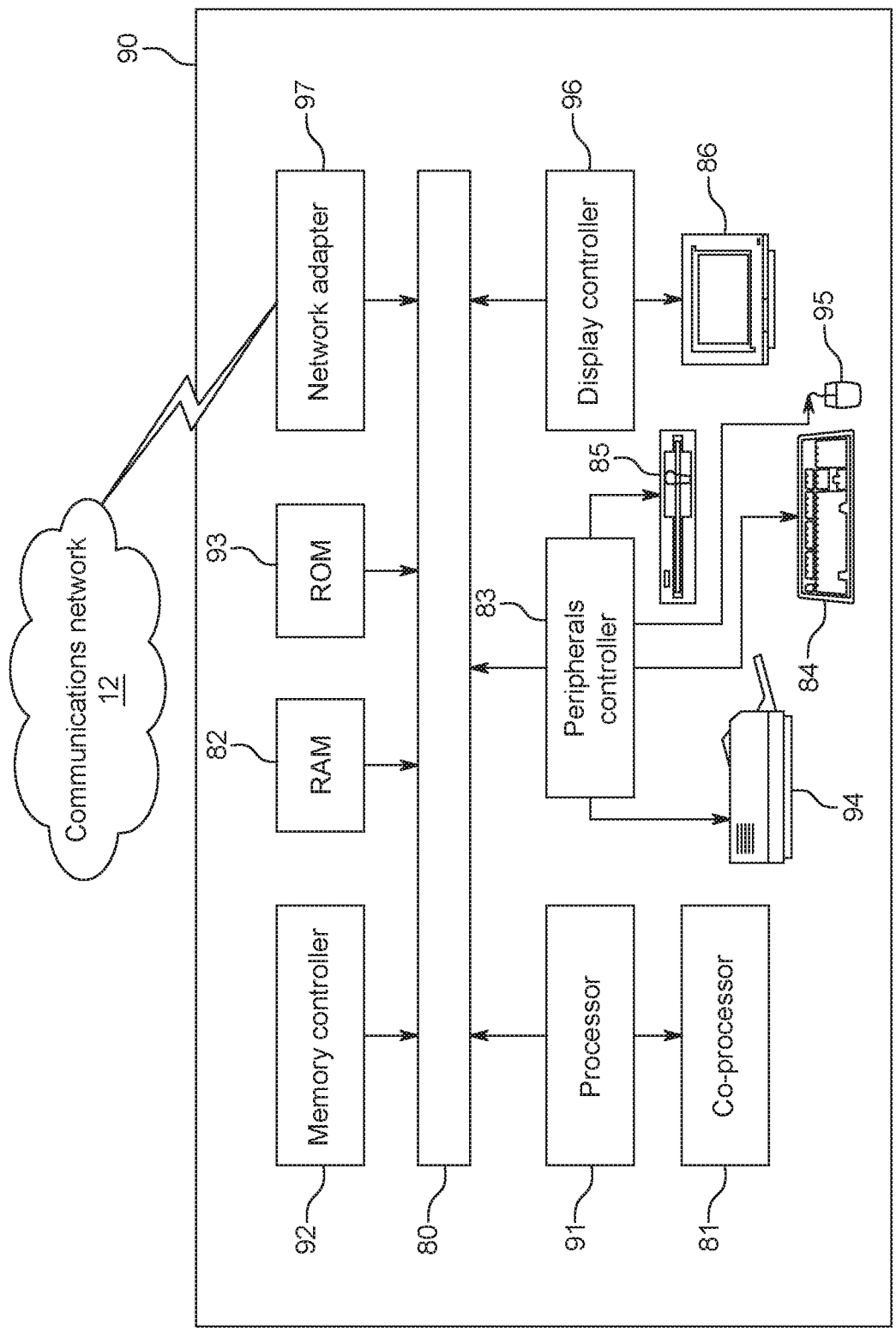
FIG. 1G is a system diagram that shows an example of a computing system used in a communication network.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

LTE V2X

V2X sidelink communication mode may be supported when the UE is served by E-UTRAN and when the UE is outside of E-UTRAN coverage. UEs authorized to use V2X services can perform V2X sidelink communication. LTE-Uu can include unicast and/or MBMS. These two operation modes may be used by a UE independently for transmission and reception, e.g., a UE can use MBMS for reception without using LTE-Uu for transmission. A UE may also receive V2X messages via LTE-Uu unicast downlink.

Rel-14 LTE V2X identifies V2X service in TR22.885 for basic road safety service. According to embodiments of the disclosure, vehicles (i.e., UEs supporting V2X applications) can exchange their own status information through sidelink, such as position, speed and heading, with other nearby vehicles, infrastructure nodes and/or pedestrians. Disclosed embodiments may include carrier aggregation, high order modulation, latency reduction, and feasibility of both transmission diversity and short TTI in sidelink. Enhanced features such as these may be based on LTE and may advantageously co-exist with Rel-14 UE in a same resource pool.

V2X in 5G NR

Benefits of embodiments in this disclosure, including V2X services, may be categorized into four use case groups: vehicle platooning, extended sensors, advanced driving and remote driving as follows:

a. Vehicle Platooning enables vehicles to dynamically form a platoon travelling together. All the vehicles in the platoon may obtain information from the leading vehicle to manage the platoon. The information may allow the vehicles going in the same direction and travelling together to drive closer, in a coordinated manner, than without platooning.

b. Extended Sensors enables the exchange of raw or processed data gathered through local sensors or live video images among vehicles, road site units, devices of pedestrian and V2X application servers. The vehicles can increase the perception of their environment beyond what their own sensors can detect and have a more broad and holistic view of the local situation. High data rate is one of the key characteristics.

c. Advanced Driving enables semi-automated or fully-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

d. Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Issues Addressed by the Embodiments

A vehicle antenna may be different from an antenna in a conventional cell phone. An NR V2X UE that is equipped with multi-panels (points) may be used for V2X communication according to at least some embodiments disclosed herein. For example, a vehicle may have two antenna panels, on front and back bumper separately, and each antenna panel may use wide beam to cover ~180 degree of area. Here, we define or assume each panel can be equipped with multiple antenna arrays and at least one transceiver unit (TXRU) is associated with each panel. Each panel is capable to be independently configured for transmission and reception at certain of bands.

In LTE, V2X communications through the PC5 interface occurs in the uplink (UL) part of the frequency spectrum. LTE PC5 sidelink communications are stated in the resource block pool (RBP). RBP and subframe pool (SP) constitute the resource pool (RP). Several RPs are provided to the UE specifically assigned for data transmission (TX) and data reception (RX) to maintain half-duplex operation. In LTE two users may transmit in the same OFDM symbol using different frequency resources. At a given moment, a user can either transmit or receive as their radio works in a half-duplex mode. Thus, both users will not receive each other's message even when located closely and will miss information necessary for safety critical decisions. They will have to wait until one or both will select a new resource for transmission. This problem is tentatively addressed by 3GPP by usage of transmission repetition so that two users which used the same sub-frame for the first transmission would use different sub-frames for the second transmission. From the system perspective, this solution increases latency, halves the network capacity, and causes conflicts in resource allocation thus reducing communication range. In NR, a same SL BWP may be used for both Tx and Rx. Each resource pool is pre-configured within a SL BWP. Hence, it requires Tx-Rx switching time and the half-duplex issue remains as in LTE V2X.

However, according to an embodiment of the present disclosure, a V2X UE equipped with multi-panels/multi-transceivers may obtain full-duplex communication because the V2X UE can use one panel for transmission and the other for reception. It can then simultaneously support multi-link, multi-bands and multi-RAT (e.g. LTE V2X, 802.11p, etc.) use cases for V2X communication. In addition, it can enable NR V2X systems to select, combine and/or dynamically switch the best panel (or transceiver) in order to support the requirements of demanding V2X communication.

Embodiments of the present disclosure further describe full-duplex operation on multi-panels for SL for at least a discovery procedure and multi-panel configuration methods and use cases for SL.

In NR Uu, there are several types of RS such as DM-RS, CSI-RS, TRS, PTRS and SRS each RS serves different purposes. For example, CSI-RS can serve CSI reporting, interference management, beam management and mobility management. However, adding SRS and CSI-RS support to SL could disadvantageously add overhead for SL resources if the channel changes very rapidly and/or interference levels change significantly due to high mobility of vehicles. In NR, the same SL BWP is used for both Tx and Rx.

According to an embodiment of the disclosure, the SL channel reciprocal property is utilized so that SL CSI-RS may advantageously gain relative to the adaptation using both CSI-RS and SRS in Uu.

In conventional V2X communication, maintaining favorable inter-symbol interference (ISI) is extremely challenging because V2X UEs may acquire different synchronization timing sources. For instance, one V2X UE may be synchronized with network or GNSS, while another V2X UE may not be synchronized with any referenced timing source.

According to an embodiment of the disclosure, it is dependent on the reference synchronization source, such as network GNSS, whether the V2X UE maintains ISI-free in SL communication when there are different synchronization timing reference signals in use. In other words, the transmission timing of V2X UE can be within the cyclic prefix (CP) range, hence, the ISI can be avoided.

In NR Uu, beam management can be divided into different parts: initial beam establishment; beam adjustment, primarily to compensate for movements and rotations of the mobile device, but also for gradual changes in the environment; and beam recovery to handle the situation when rapid changes in the environment disrupt the current beam pair.

According to an embodiment of the disclosure, FR2 is arranged to support V2X use cases without beam management in some scenarios. Field trial results indicate wide-beam operation may be enough to have good signal quality between Tx and Rx even with the case of multiple blocking vehicles in between. Therefore, the full-blown beam management procedure introduced in NR Uu can be simplified for NR sidelink beam management in FR2 to utilize the channel reciprocity property in SL and reduce beam management latency according to a disclosed embodiment. Furthermore, an embodiment of the disclosed BM procedure can support unicast and groupcast.

Overview

In following sections of the disclosure, embodiments are described regarding NR V2X communication for vehicles equipped with multi-panels/transceivers. For those solutions, at least two use cases are described: intra-band with multi-panels/transceiver; and inter-band with multi-panels/transceivers. The disclosure also describes a configuration method when a V2X UE is equipped with multi-panels/transceivers.

Additionally, following sections of the disclosure describe embodiments regarding SL RS design for SL DM-RS, SL CSI-RS, SL TRS and SL PRS. Furthermore, the design of SL RS to support multi-panels transmission is also described.

Sections of the disclosure also describe a design for maintaining the ISI-free for V2X communication. The embodiments are described with respect to two different use cases: in a network-assisted mode and in a V2X UE autonomous mode.

Other sections of the disclosure describe a fast beamforming training scheme for NR V2X communication that can reduce SL CSI-RS signaling overhead and utilize the channel reciprocal property.

DETAILED DESCRIPTION

Multi-Panels for V2X Communication

The following section describes embodiments using multi-panels/transceivers for V2X communication.

Figure 2A:
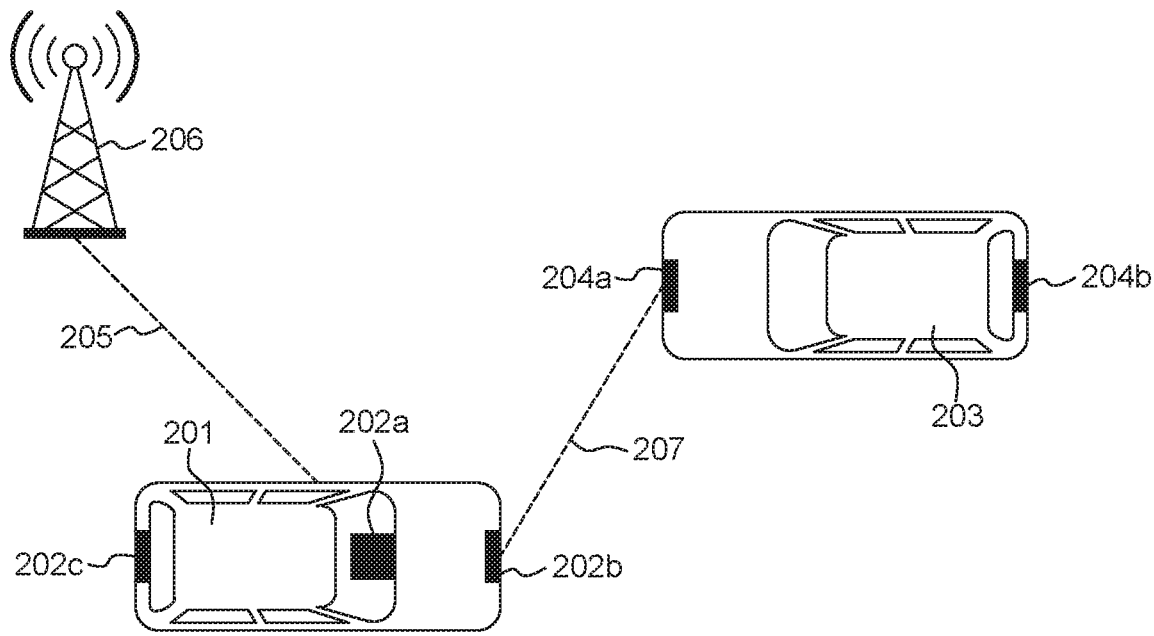
FIG. 2A shows an example of a multi-panel/multi-transceiver use case in accordance with an exemplary embodiment.
Figure 2B:
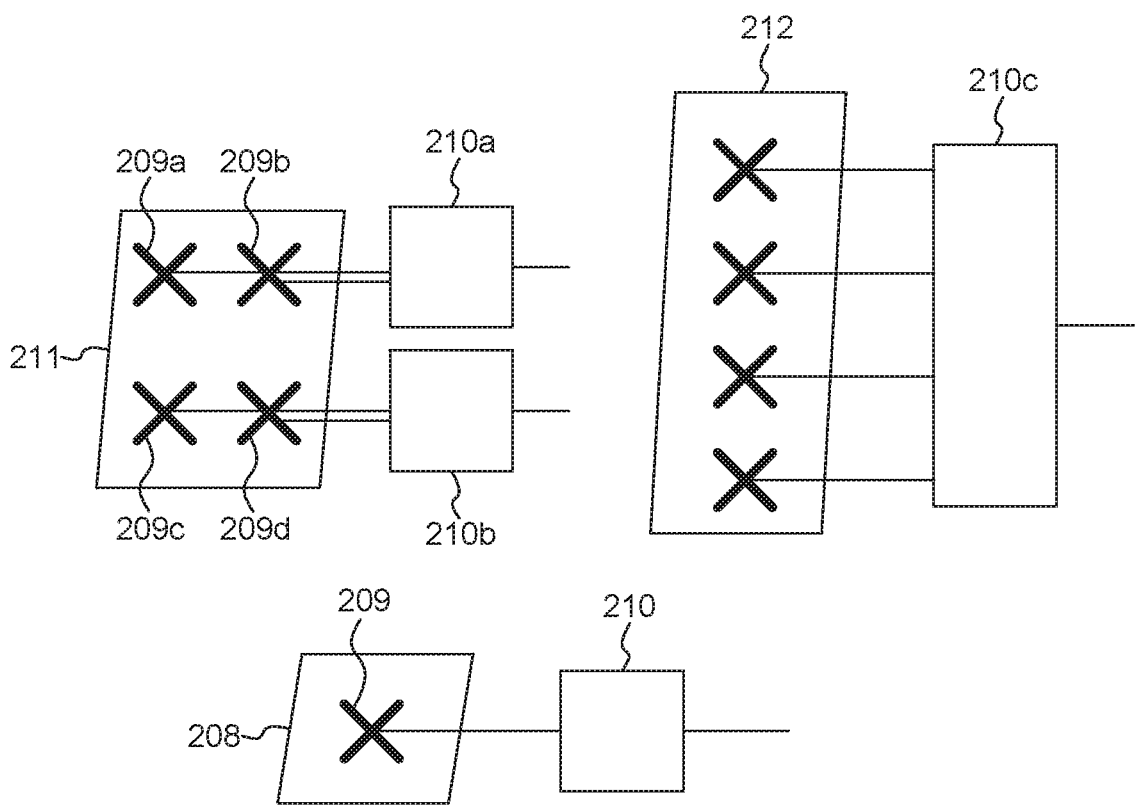
FIG. 2B shows examples of antenna panel connections to transceivers in accordance with exemplary embodiments.

An embodiment according to the disclosure including multi-panels for V2X communication provides several possible advantages. For example, vehicles A 201 shown in FIG. 2A may be equipped with three transceiver (TRX) panels where the first one 202a is mounted at the roof and the second 202b and third 202c are placed at the front and back bumpers, respectively. Alternatively, a vehicle B 203 may be equipped with two TRX panels where the first one 204a is on the front bumper and the second one 204b is on the back bumper. One of the use cases for multi-panels for V2X communication is the multi-bands such as FR1 and FR2 band in NR transmission and reception. FR1 band can be used for awareness and warning with larger coverage and less blockage probability. On the other hand, FR2 (mm-Wave) band can be used for collision avoidance and coordination of vehicles in the close vicinity. For example, the FR1 band 205 may be used for V2I with an access network 206, and the FR2 band 207 may be used for V2V between vehicle A 201 and vehicle B 203. Therefore, utilization of multi-panel for multi-bands V2X communication can reduce blocking probability and enhance SL performance. FIG. 2B shows examples of different antenna panel connections to transceivers in accordance with exemplary embodiments. As illustrated in FIG. 2B, the simplest panel implementation is that a panel 208 can be with a single antenna element 208 and one transceiver 210. Therefore, by our definition, a panel can be treated as a transceiver. Other embodiments are possible using plural antenna elements 209 and different combinations of panels and transceivers. For example, FIG. 2B shows panel 211 including antenna elements 209a and 209b connected to a first transceiver 210a, and also including antenna elements 209c and 209d connected to a second transceiver 210b. Alternatively, a panel 212 may include antenna elements 209e, 209f, 209g, and 209h all connected to a same transceiver 210c.

The following sections describe embodiments according to two use cases for NR V2X communication when a UE is equipped with multi-panels: case 1: multi-panels/transceivers for intra-band V2X communication; and case 2: multi-panels for inter-band V2X communication.

Multi-Panels for Intra-Band V2X Communication

Figure 3A:
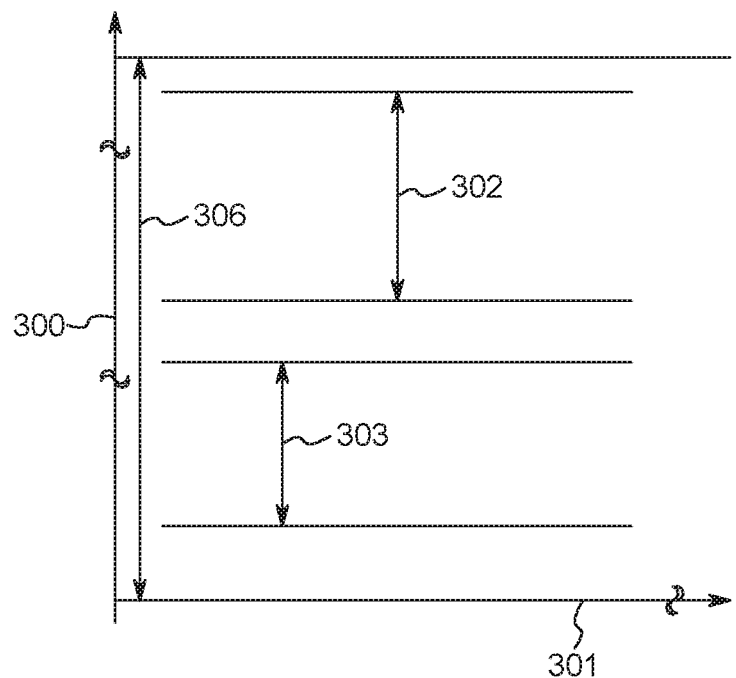
FIG. 3A shows a multi-panel/multi-transceiver use case for intra-band NR V2X communication with non-overlapped SL-BWP in accordance with an exemplary embodiment.
Figure 3B:
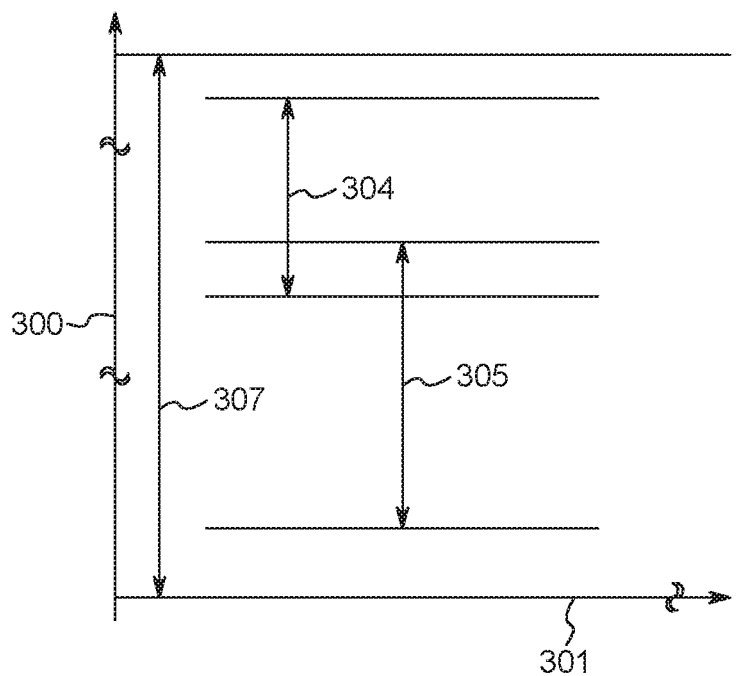
FIG. 3B shows a multi-panel/multi-transceiver use case for intra-band NR V2X communication with overlapped SL-BWP in accordance with an exemplary embodiment.

For instance, an embodiment may include a vehicle (or UE) that is equipped with two panels, each associated with multiple antennas and at least one transceiver (TXRU). Thus, the term multi-panel as used herein may also be considered to mean multi-transceiver. Each panel can be independently configured for V2X communication for a certain SL band (or a BWP). As shown in frequency allocation diagrams of FIGS. 3A and 3B the vehicle (UE) can be configured with (two) BWPs or a same BWP for simultaneous transmission and reception. In FIGS. 3A and 3B, a vertical access represents SL BW and a horizontal access represents Time t. Each configured BWP can be fully overlapped (note: when configured BWPs are fully overlapped, it can be treated as a same BWP), partially overlapped, or non-overlapped in the frequency domain resource. FIG. 3A shows a non-overlapped SL-BWP 306 example in which SL BWP-1 302 does not overlap SL BWP-2 303. FIG. 3B shows an overlapped SL-BWP 307 example in which SL BWP-1 304 overlaps SL BWP-2 305. The frequency domain resource can be based on a certain band and that band may be, for example, NR FR1 or FR2. In the following subsection, methods of multi-panels transmission and reception for intra-band SL communication according to embodiments are described in further detail.

Discovery Procedure

Figure 4:
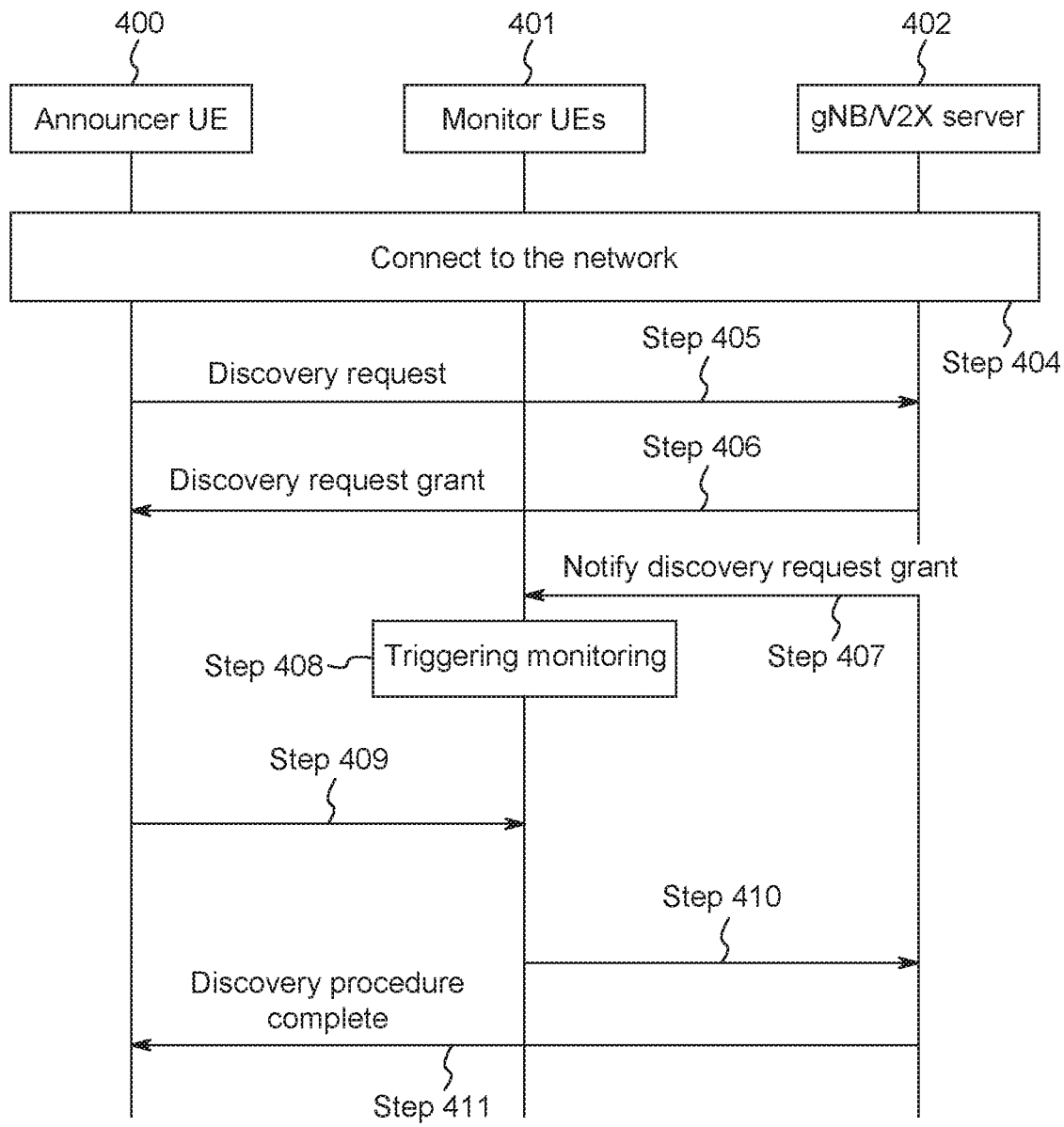
FIG. 4 shows discovery messaging in case of network-assistance in accordance with an exemplary embodiment.
Figure 5:
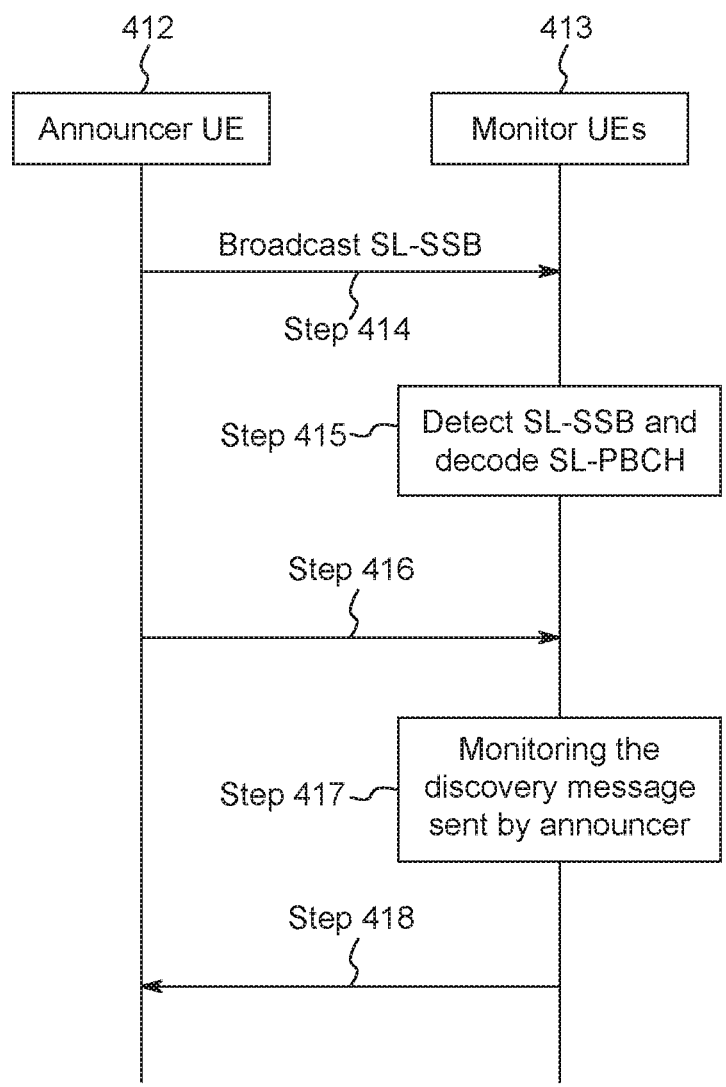
FIG. 5 shows discovery messaging in a case without network-assistance in accordance with an exemplary embodiment.

FIGS. 4 and 5 show examples of discovery procedures according to embodiments of the invention:

Discovery message (request or response) may carry proximity region information, location information and capability information in terms of support for full duplex or half duplex.

Discovery message can be transmitted using SDM multiplexing scheme or TSTD scheme.

The announcer and monitoring UEs may use predefined time-frequency resources for SL-SSB transmission and reception respectively.

Figure 7:
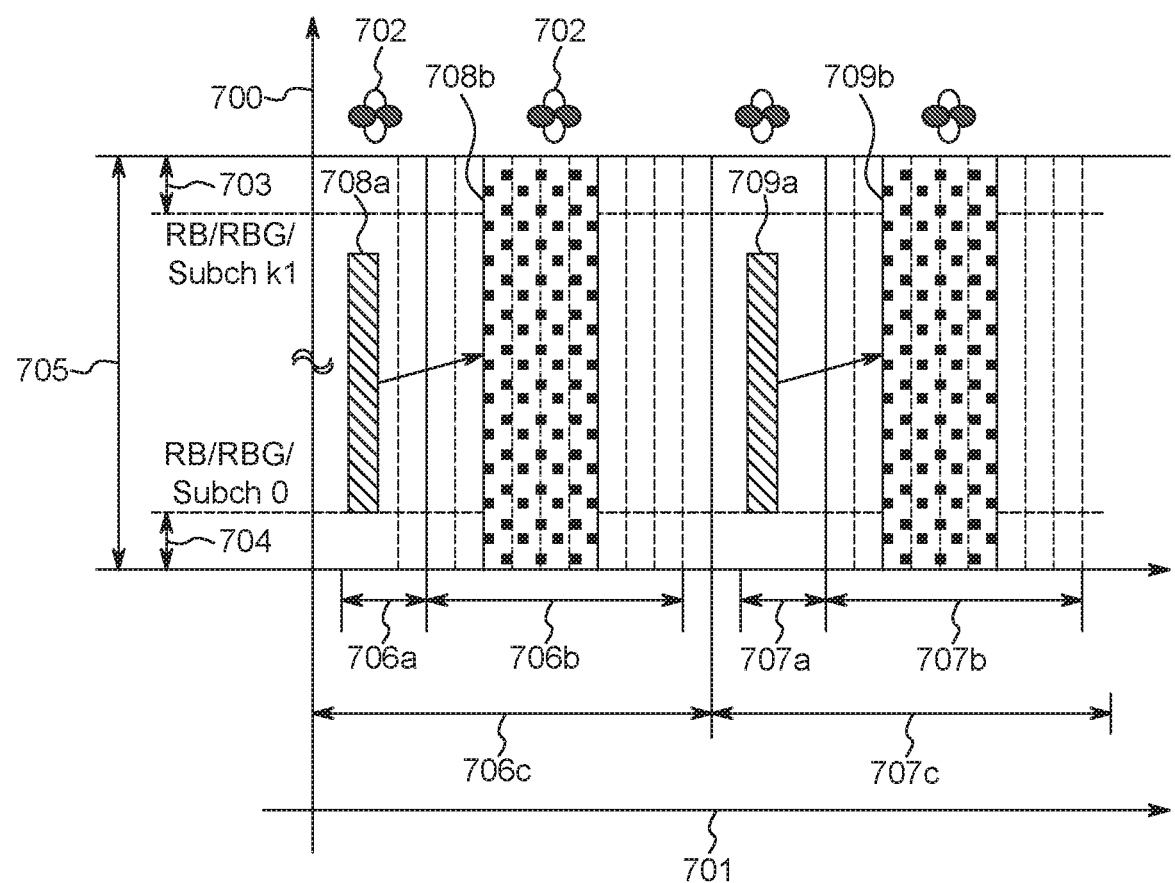
FIG. 7 shows discovery messaging for intra-band NR V2X communication in accordance with an exemplary embodiment.

The monitoring UE decodes the SL-PBCH from SL-SSB reception, wherein the SL-PBCH may indicate a time-and-frequency resource for a SL control channel (SCI)/PSCCH and the PSCCH can point outthe PSSCH carrying the discovery message shown in FIG. 7.

V2X UE may assume the DM-RS used for demodulating the PSSCH carrying the discovery message is QCLed with the detected SL-SSB from the same UE.

The discovery feedback message includes the piggybacked feedback of the decoded discovery message. Such feedback may contain more than one acknowledgement, since several discovery messages may be successfully decoded by the time when discovery messages are transmitted. According to the example of FIG. 4 showing a discovery message with network-assist, each of an announcer UE 400, Monitor UEs 401, and gNB/V2X Server 402 connect to the network in Step 404. The Announcer UE 400 sends a Discovery Request to the gNB/V2X Server 402 in Step 405. The gNB/V2X Server 402 sends a Discovery Request Grant to the Announcer UE 400 in Step 406. In Step 407, the gNB/V2X Server 402 sends a Notify Discover Request Grant to the Monitor UEs 401. The monitor UEs 401 perform triggering monitoring in Step 408. The Announcer UE 400 transmits its message (PSSCH) on a configured BWP to the monitors over the PC5 interface 1: SDM, 2: TSTD in Step 409. In Step 410, the Monitor UEs 401 transmit the match result: confirmation of the announcer to the gNB/V2X Server 402. In Step 412, the gNB/V2X Server 402 sends a Discovery procedure complete to the Announcer UE 400. According to the example of FIG. 5 showing a discovery message without network-assist, the Announcer UE 412 sends a Broadcast SL-SSB to the Monitor UEs 413 in Step 414. In Step 415, the Monitor UEs 413 detect SL-SSB and decode SL-PBCH, which indicates the time-frequency resources for other proximity to monitor. In Step 416, the Announcer UE 412 transmits discovery message on the Announcer UE 412's scheduled time-frequency resource. In Step 417, the Monitor UEs 413 monitor the discovery message sent by the Announcer UE 412. In Step 418, the Monitor UEs transmit discovery feedback message on the Announcer UE 412's scheduled time-frequency resource.

Figure 6:
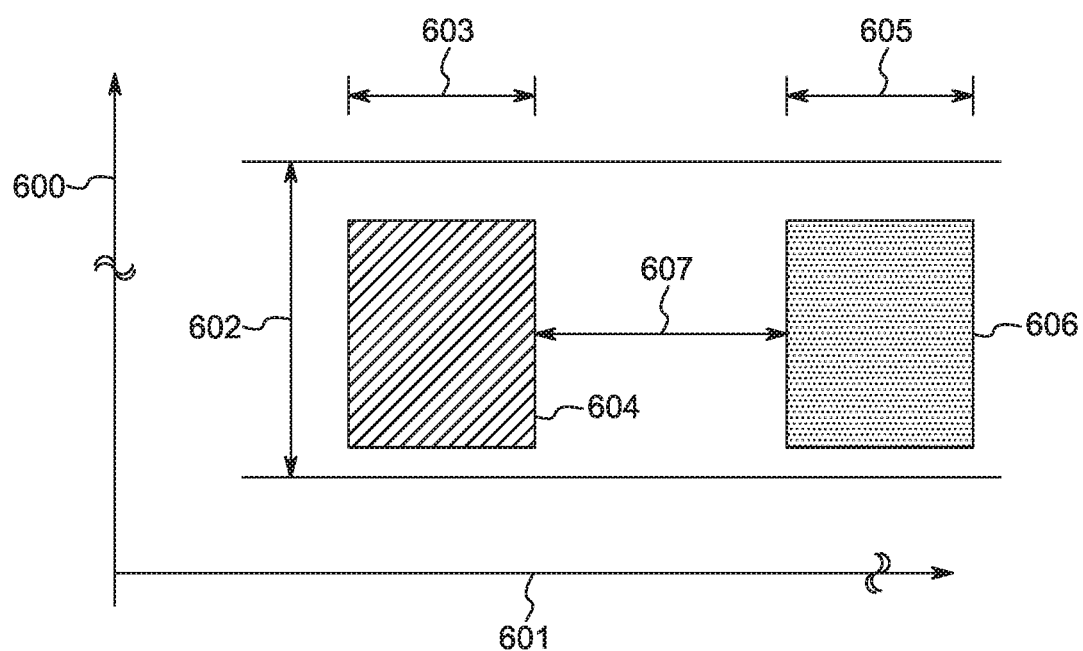
FIG. 6 shows discovery Tx window and feedback discovery message time-frequency resource in accordance with an exemplary embodiment.

FIG. 6 shows a frequency versus time graph of an embodiment in which a V2X UE can transmit a discovery message on a reserved Tx window. In the Tx window, V2X UE can transmit multiple discovery messages to increase the detection probability. The V2X UE can assume PSCCH and PSSCH is QCLed with SL-SSB, i.e., no SL TCI indication is needed for transmissions of discovery message. According to the example of FIG. 6 showing the time-frequency resources for discover Tx window and feedback discover message, frequency 600 is represented on a vertical axis and time 601 is represented on a horizontal axis. Within an SL-BWP 602 a first window for a TX discovery message 604 spans a time period 603, a second window for discover feedback message 606 spans a time period 605, and a discovery feedback offset 607 separates the first window 604 and second window 606. FIG. 7 shows an example of a discovery message for intra-band NR V2X communication in which frequency 700 is represented on a vertical axis and time 701 is represented on a horizontal axis. In this example, a BWP1 705 includes RB/RBG/Sub-channel 0 704 and RB/RBG/Sub-channel k1 703. Time slot I 706c and time slot I+1 707c are depicted along the time axis. Time slot I 706c includes a control region 706a that includes SC1 708a, and a data/signal transmission region 706b that includes data/signal transmission 708b. Time slot I+1 707c includes a control region 707a that includes SC1 709a, and a data/signal transmission region 707b that includes data/signal transmission 709b. As shown in this example, each signal/channel may be sent as QCL with SL-SSB 702.

According to one embodiment, after successful discovery, it is not necessary to preserve the automatic gain control (AGC) symbol and GAP symbols (for TX-RX switching time) in the time-slot for a V2X UE when using multi-panel/multi-transceiver for intra-band operation. This is because V2X UE may transmit and receive simultaneously if V2X UE is equipped multi-panel (or multiple transceivers). Both monitoring V2X UE and announcing V2X UE can support transmit and receive simultaneously, and therefore, according to one embodiment, it is not necessary to preserve the AGC and GAP symbols. The AGC and/or GAP symbol can be used to carry the discovery message (PSSCH), hence, it can increase the spectrum usage.

PSSCH and PSCCH Configuration for SL with Multi-panels

According to an embodiment of the disclosure using multiple-PSSCH and PSCCH based multi-panel/multi-transceiver SL transmission and reception, the following configuration methods for a scheduled BWP may be used:

The maximum number of $N_s$ TCI states within a single slot, with fully/partial overlapped time-frequency resource allocation (in a same BWP or different BWPs)

The maximum number of $N_f$ TCI states within the single slot, with non-overlapped frequency resource allocation (in a same BWP or different BWPs)

The maximum number of $N_t$ TCI states within the single slot, with (partially) overlapped time slot resource allocation. (in a same BWP or different BWPs) The set $\{N_s, N_f, N_t\}$ or $N_s$ are/is SL higher layer (PC5-RRC) configuration parameters for multiple-PSSCH based multi-panel SL intra-band transmission and reception. Note, the $N_f$ and $N_t$ can be treated as a case of $N_s$. When $N_f$ is configured with multiple different frequency offsets (e.g. PRB offsets) and $N_t$ is configured with multiple different or a same time offset (e.g. OFDM symbol offset(s)). UE may explicitly report the capability of the $N_s$, $N_f$ or $N_t$ in the discovery message to other UEs or may implicitly indicate the capability of $N_s$, $N_f$ or $N_t$ when it reserves the SL resources for a/some UE(s). For example, a UE simultaneously transmit multiple SCI/PSCCH (e.g., $1^{st}$ stage SCI) in a reserved SL sot, or an monitor UE is capable to decode/receive multiple SCIs simultaneously from a UE in a reserved resource pool or multiple resource pools.

- The maximum number of layers per PSSCH and the maximum number of layers across all coordination panels
- PSSCH scrambling based on the multi-panel capability, where PSSCH scrambling initialization is a function of SL-SSID. The SL-SSID can be obtained from SL-SSB.
- SL-CORESET, the SL-CORESET resource can be dependent on the capability of $N_s$, $N_f$ or $N_t$ parameters.
- PSCCH/PSSCH processing/preparation timing. This is related to ACK/NACK of PSSCH feedback timing.

For V2X transmission mode 1, i.e., network, e.g. gNB, schedules the sidelink resources used by the V2X UE for sidelink transmission. In transmission mode 1, network can be dependent on V2X UE $N_s$, $N_f$, or $N_t$ capability/category (or $N_s$, $N_f$, or $N_t$ can be treated as V2X UE category) to schedule SL BWP(s). For instance, network can schedule multiple SL BWPs if V2X UE is capable to do so. In transmission mode 2 (i.e., UE autonomous transmission mode), V2X UE determines the sidelink resources used for sidelink transmission configured by pre-configured sidelink resources. V2X UE $N_s$, $N_f$, or $N_t$ capability/category can be exchanged during the V2X discovery procedure.

Multi-Panels for Inter-Band V2X Communication

According to a disclosed embodiment, a V2X UE uses multi-band interfaces to communicate with different V2X UEs that participate in the V2X service. Improved communication ranges can be achieved by using, e.g., different transmission power levels and beamwidth from different panels. Hence, an embodiment according to this disclosure can provide two different coverages for V2X communication. For example, when two vehicles only have available FR1 SL (e.g., when they are out of FR2 communication range), they could use FR 1 to assist beamforming for FR 2 SL according to an embodiment.

Figure 8:
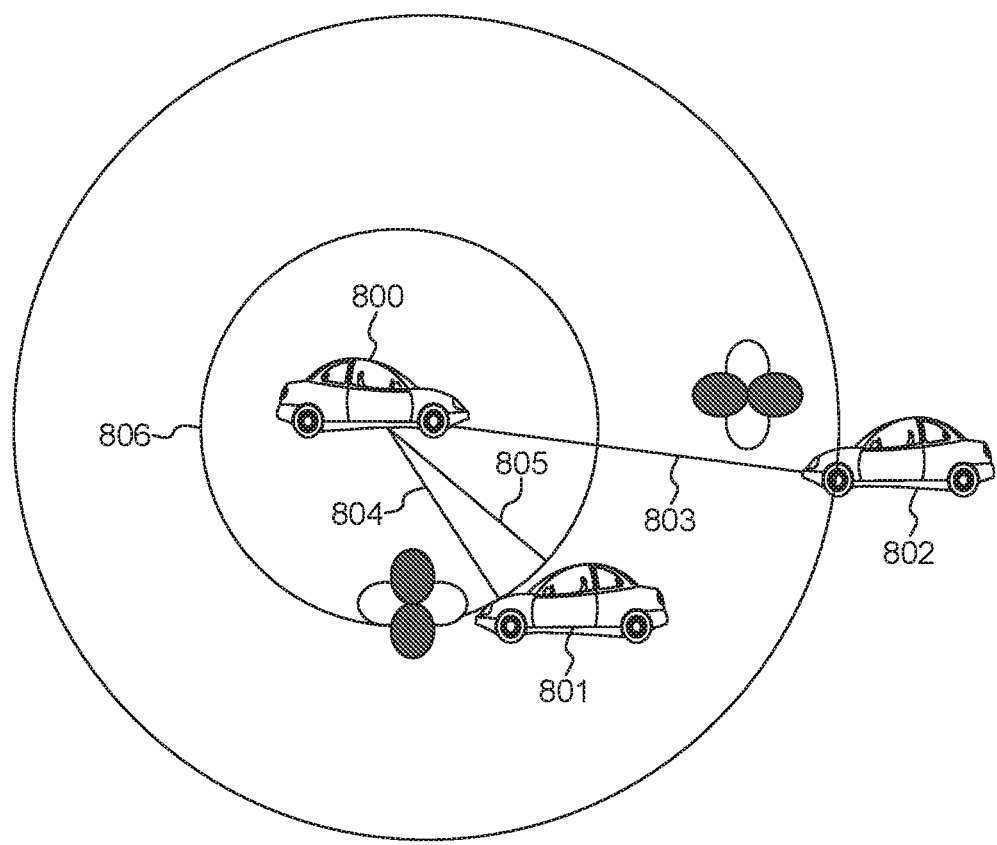
FIG. 8 shows multi-panel use cases for inter-band NR V2X communication in accordance with an exemplary embodiment.
Figure 9A:
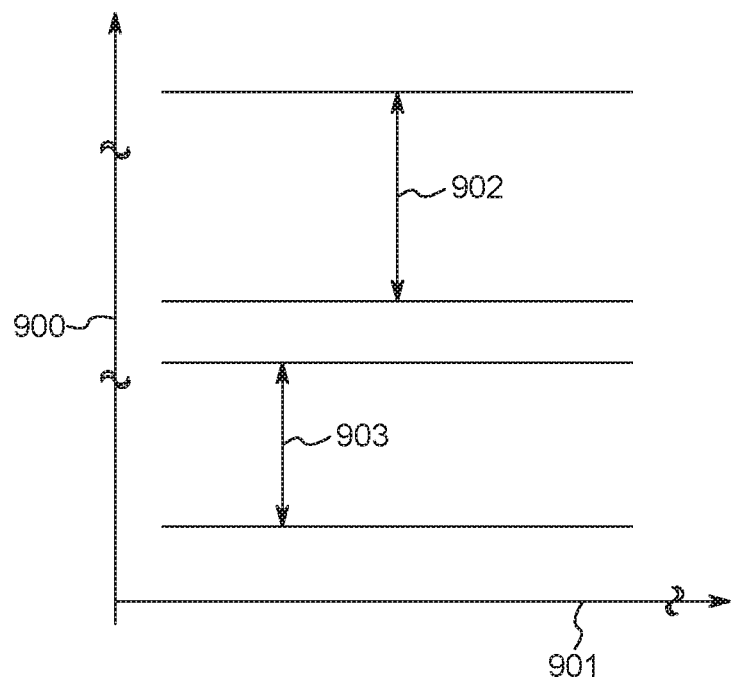
FIG. 9A shows multi-panel use cases for inter-band NR V2X communication with FR2-FR1 in accordance with an exemplary embodiment.
Figure 9B:
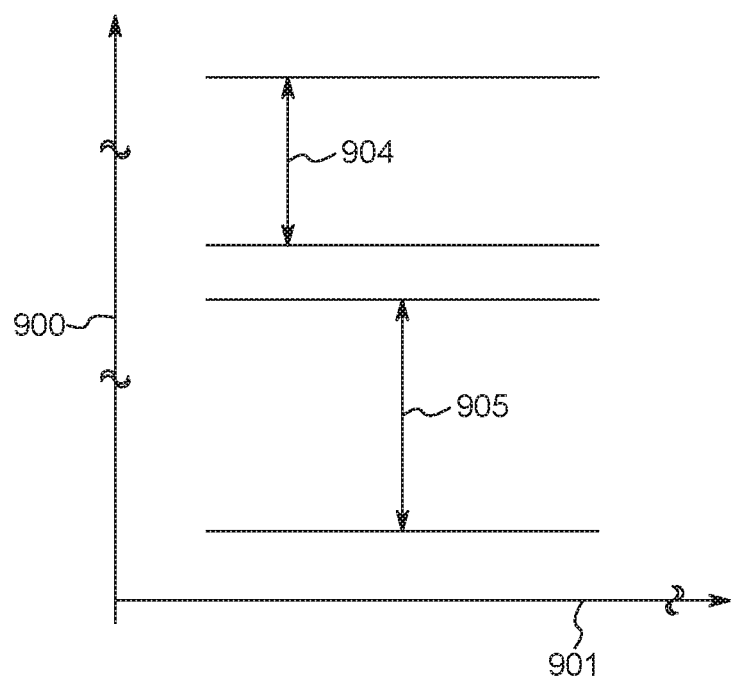
FIG. 9B shows multi-panel use cases for inter-band NR V2X communication with two FR1 bands in accordance with an exemplary embodiment.

FIG. 8 shows an example in which V2X UE A 800 and V2X UE C 802 can communicate geo-location information via V2V using wide-beam FR1 803. When V2X UE A 800 and V2X UE C 802 are within the FR2 range 806, the FR2 narrow-beam connection can be triggered. The V2X UE 801 can simultaneously transmit short- and long-range messages via FR2 805 and FR1 804 bands as shown in FIGS. 9A and 9B, respectively. Thus, an embodiment of the disclosure may enable NR V2X systems to select, combine and/or dynamically switch the best interface (i.e., FR1 or FR2 in this case) in order to support the QoS requirements of demanding V2X services. In FIG. 8, the coverage of FR1 is much bigger than FR2. Thus, two V2X UEs that have FR2 SL can also have a FR1 SL at the same time. If both links are active, a V2X UE can select transmission interface (i.e., FR1 or FR2 or both FR1 and FR2) based on the type of message according to one embodiment. Also, if FR2 is block, two V2X UEs can still use FR1 to communicate with each other according to an embodiment. For example, FIGS. 9A and 9B each show frequency on a vertical axis 900 and time on a horizontal axis 901. According to the example of multi-panel use case for inter-band NR V2X communication with inter-band FR2-FR1 in FIG. 9A, an FR2 frequency region is SL-BWP 902 and an FR1 frequency region is SL-BWP 903. According to the example of multi-panel use case for inter-band communication between two FR1 bands in FIG. 9B, a first FR1 frequency region is SL-BWP 904 and a second FR1 frequency region is SL-BWP 905.

This combination of FR2 (mmWave) and FR1 bands is a suitable solution for road safety applications. FR1 bands can be used for awareness and warning dissemination. On the other hand, FR2 bands can be used for collision avoidance and coordination of vehicles in the proximity. However, V2X communication on FR2 band may suffer the blockage issue. Hence, if V2X UE A, B and C are capable of simultaneous FR1 and FR2 communication, an embodiment of the disclosure may advantageously maintain an FR1 link in both A-B and A-C, as a fallback as shown in FIG. 8. Links on FR2 (A-B and/or A-C) could be added as needed.

Figure 10:
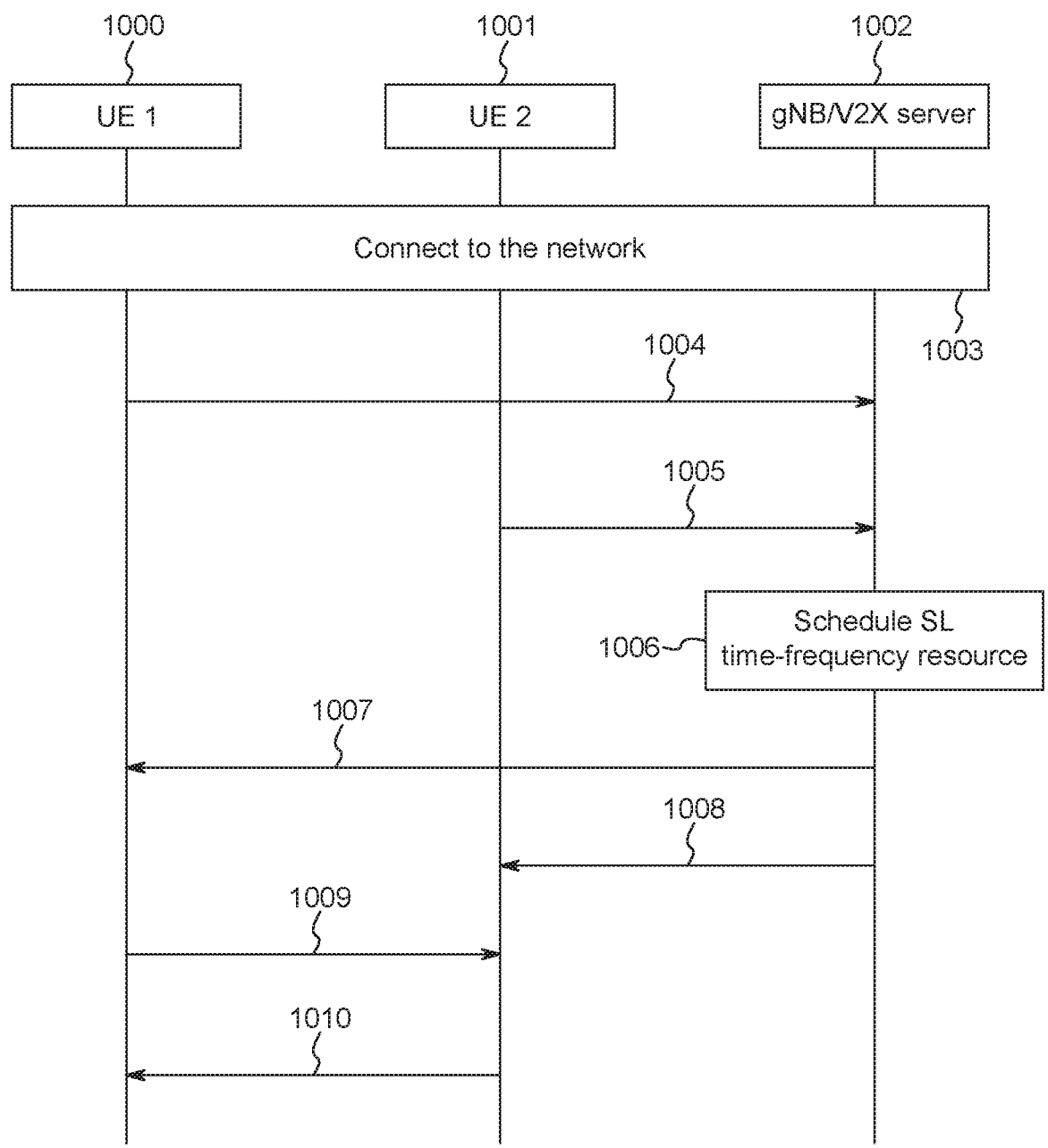
FIG. 10 shows messaging for a network (gNB) assisted inter-band NR V2X communication in accordance with an exemplary embodiment.

FIG. 10 shows a use case of network (gNB) assisted inter-band for NR V2X communication. According to an embodiment, V2X UE can report its inter-band capability to network so network can choose either a proper interface (i.e., an interface using a band that provides desired capabilities) or using multi-bands simultaneously for SL transmission. For example, gNB can perform location-aware scheduling to help QoS requirements for packet delivery to select a proper V2V interface between V2X UEs according to an embodiment. According to the example of FIG. 10, each of a UE 1 1000, UE 2 1001, and gNB/V2X Server 1002 connect to the network in Step 1003. The UE 1 1000 reports V2X communication capability for inter-band to the gNB/V2X Server 1002 in Step 1004. The UE 2 1001 reports V2X communication capability for inter-band to the gNB/V2X Server 1002 in Step 1005. In Step 1006, the gNB/V2X Server 1002 schedules SL time-frequency resources for inter-band (e.g., FR1 and FR2) and/or single-band (e.g., FR1 or FR2). The gNB/V2X Server 1002 informs scheduled SL time-frequency resource to UE 1 1000 in Step 1007, and the gNB/V2X Server 1002 informs scheduled SL time-frequency resource to UE 2 1001 in Step 1008. The UE 1 1000 transmits PSCCH and PSSCH on scheduled time-frequency resource to UE 2 1001 in Step 1009. The UE 2 1001 transmits ACK to UE 1 1000 via PSFCH on scheduled time-frequency resource in Step 1010.

SL RS Design

There are many types of RS signals in NR Uu interface such as DM-RS, CSI-RS, PT-RS, TRS and SRS. However, due to the property of high mobility and Doppler effects in SL, an embodiment according to the disclosure provides a unified structure for SL RS design.

SL RS can be configured according to an embodiment according to a maximum number of antenna ports Y, across all V2X UEs in a network. The Y antenna ports are partitioned for different use cases such as DMRS for PSSCH (SL-DMRS), channel status information (SL CSI-RS), timing tracking reference signal (SL TRS) and position reference signal (SL PRS) antenna ports. For instance, antenna ports 1 to 32 can be reserved for SL DM-RS antenna ports, 1001 to 1032 can be reserved for SL CSI-RS antenna ports, and 2001 to 2016 can be reserved for SL PRS antenna ports. Note, those reserved antenna ports are pre-defined for V2X UE, so V2X UE doesn't need to exchange those antenna ports over the air signaling, which can also save signaling overhead. Depending on UE capability of UE's in a network, not all of SL RS should be supported for every communication. For example, SL PRS may not be required for all V2X UEs. Furthermore, the number of supported antenna ports is also dependent on V2X UE capability. For instance, V2X UE A may be capable to support up to 16 SL CSI-RS antennas ports, but V2X UE B may be capable to support up to 32 ports. The capability (i.e., the particular number of ports that can be supported in a V2X UE) can be exchanged between the V2X UEs via PC5-RRC messages.

SL RS such as SL DM-RS, SL CSI-RS, SL TRS, and SL PRS can support multiple antenna port patterns (in a SL transmission slot). An antenna port pattern can be described as the following configuration parameters:

Symbol offset: the time slot that includes the SL RS start symbol

Figure 11:
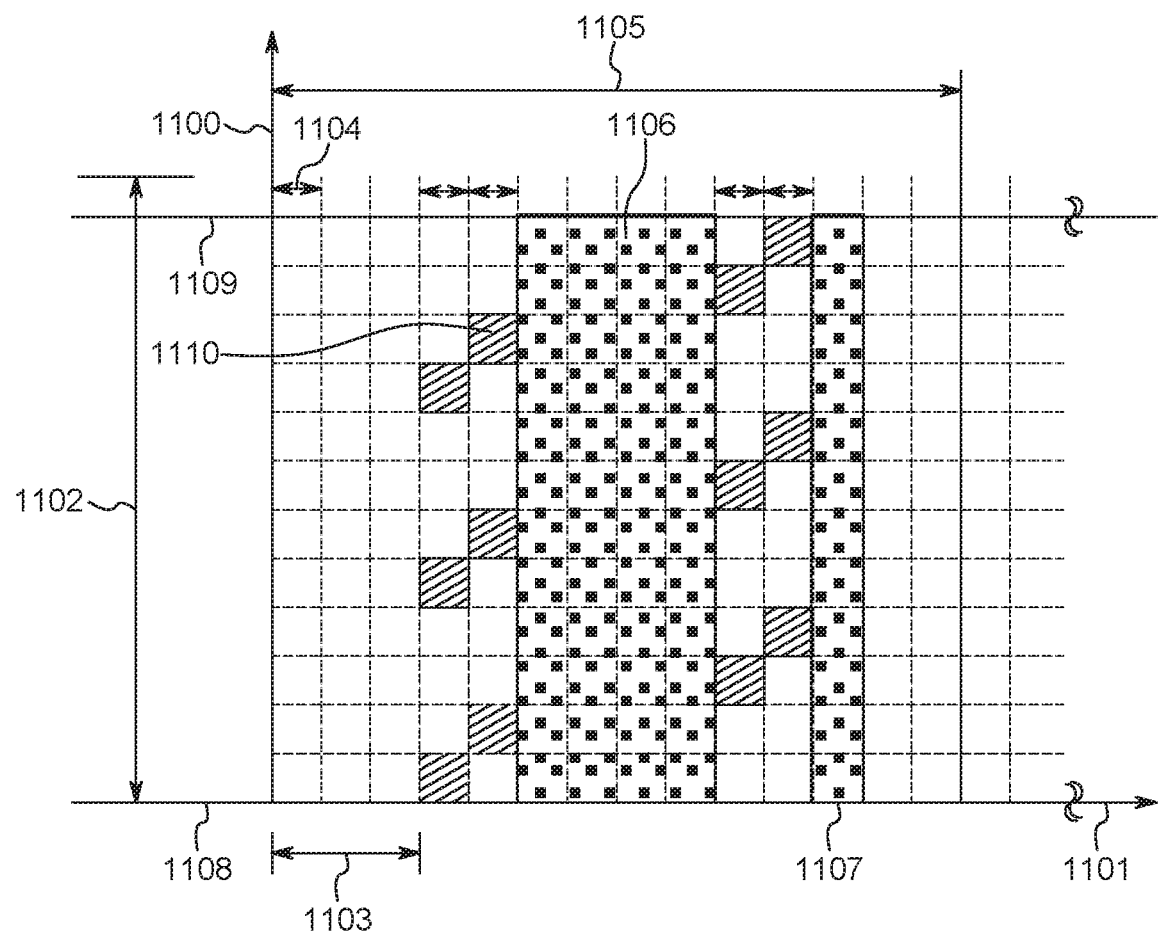
FIG. 11 shows a SL DM-RS pattern and additional SL DM-RSs in accordance with an exemplary embodiment.

Frequency domain (FD) density: for example, SL RS density in FD=3, i.e., the density is every three frequency resource elements Symbol location: which relative symbol that SL RS will be transmitted in a time slot or relative to the start of data symbol Sequence length: The maximum length of SL RS can be span in FD within a symbol An exemplary SL DM-RS pattern according to one embodiment includes a first SL DM-RS in symbol 2 or 3 of the slot and the SL DM-RS is mapped relative to the start of the slot boundary, regardless of where in the slot the actual data transmission starts. This mapping type is primarily intended for the case where the data occupies a slot. The reason for symbol 2 or 3 in the SL is to locate the first SL DM-RS occasion after a SL CORESET (e.g., resource pool for SCI) located at the beginning of a slot. Note: whether (SL) CORESET is introduced for SL or not, the first SL DM-RS location in a slot may still be applied. Also, a V2X UE according to an embodiment can support multiple antenna ports to overcome high Doppler to have better channel estimation performance. For example, similar to Uu, an embodiment may include "sl-dmrs-AdditionalPosition" information element (IE) for SL DM-RS, which can be achieved by inserting additional SL DM-RS antenna ports. FIG. 11 shows an example of a V2X UE configured with more than one SL DM-RS antenna ports according to an embodiment of the disclosure. According to the example showing an SL DM-RS pattern and additional SL DM-RSs in FIG. 11, frequency 1100 is shown on a vertical axis 1100 and time 1101 is shown on a horizontal axis. Within a frequency range SL-RB 1102, from RE0 1108 to RE11 1109, are included a symbol location for SL-RS 1105 and a location for additional SL DM-RS 1107. Also shown are symbol 0 period 1104, symbol offset 1103, and SL-RS 1110.

Another SL DM-RS pattern example includes where the first SL DM-RS is in the first symbol of the data allocation, that is, the SL DM-RS location is not given relative to the slot boundary but rather relative to where the data are located. Using this approach, transmissions over a small fraction of the slots can support very low latency and other transmissions that benefit from not waiting until a slot boundary starts but can be used regardless of the transmission duration. The mapping type for PSSCH transmission can be dynamically signaled as part of the SCI, while for the PSSCH the mapping type is semi-statically configured.

Figure 12:
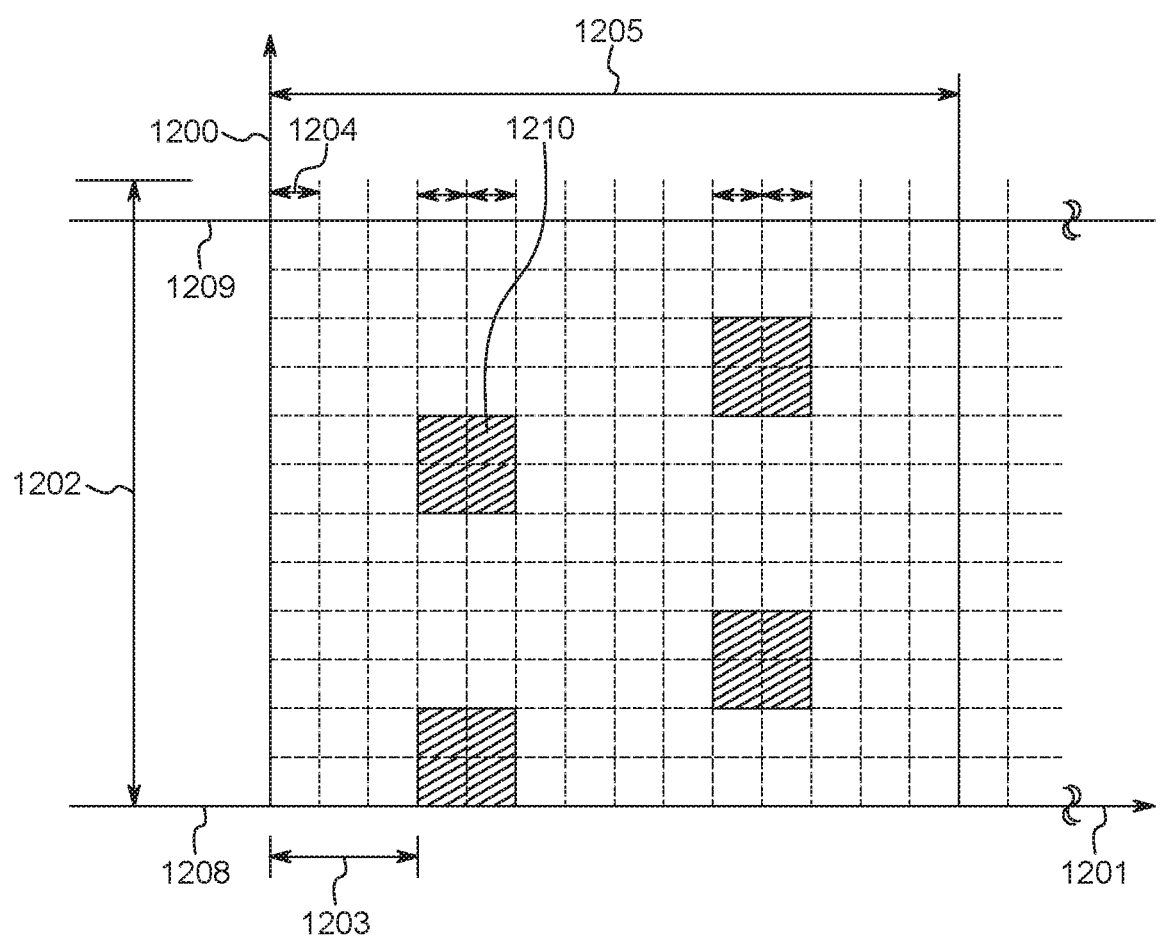
FIG. 12 shows a SL-RS dual-port pattern in accordance with an exemplary embodiment.

FIG. 12 shows an embodiment of SL DMRS or SL CSI-RS support for a dual-port pattern, which can apply orthogonality covering code. FIG. 12 shows an example of an SL-RS dual-port pattern having frequency 1200 on a vertical axis and time 1201 on a horizontal axis. Within a frequency range SL-RB 1202, from RE0 1208 to RE11 1209, are included symbol locations for SL-RS 1210. Also shown are symbol 0 period 1204 and symbol offset 1203.

Figure 13:
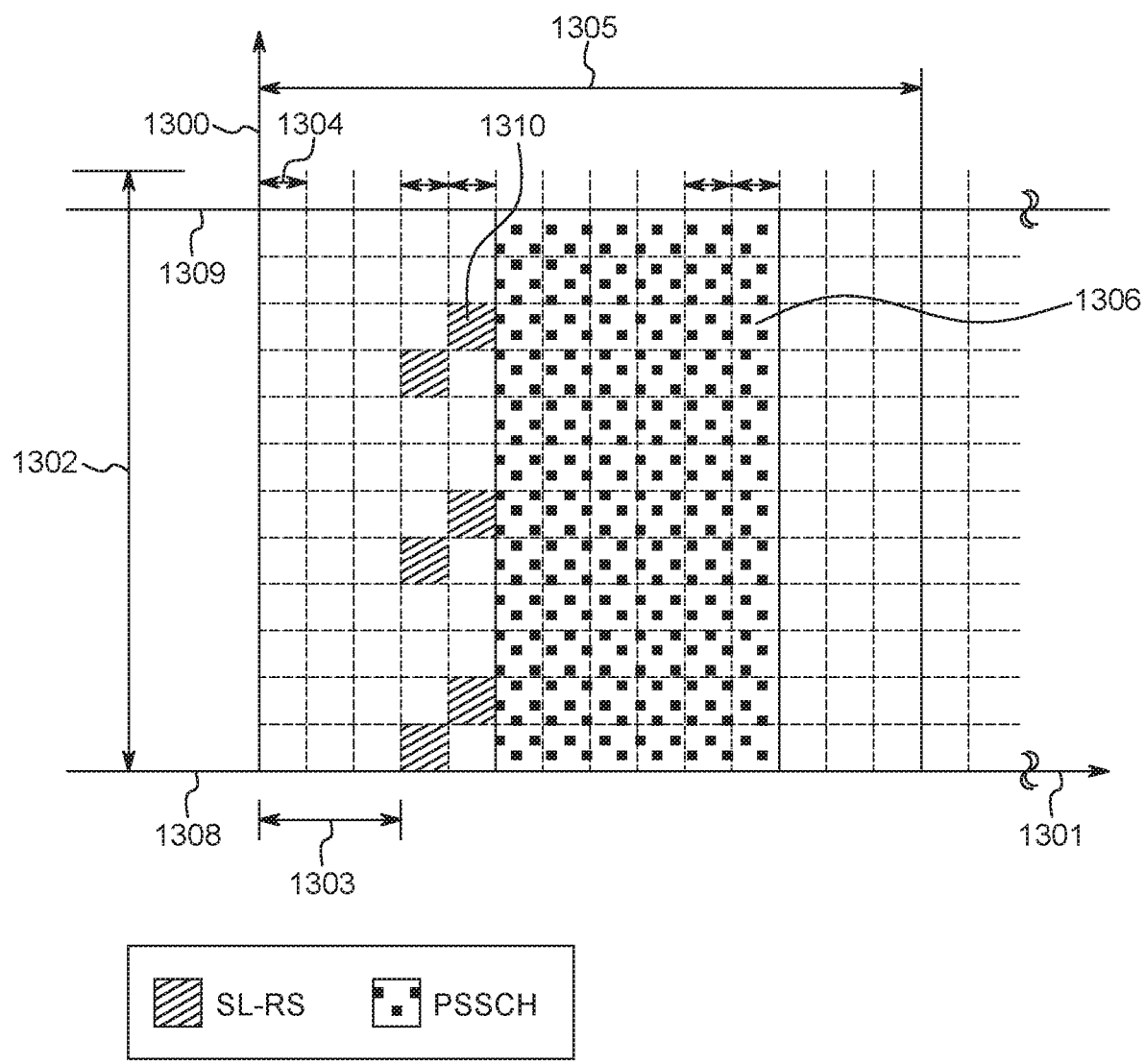
FIG. 13 shows a SL-RS that is not multiplexing with PSSCH in time and frequency domain in accordance with an exemplary embodiment.
Figure 14:
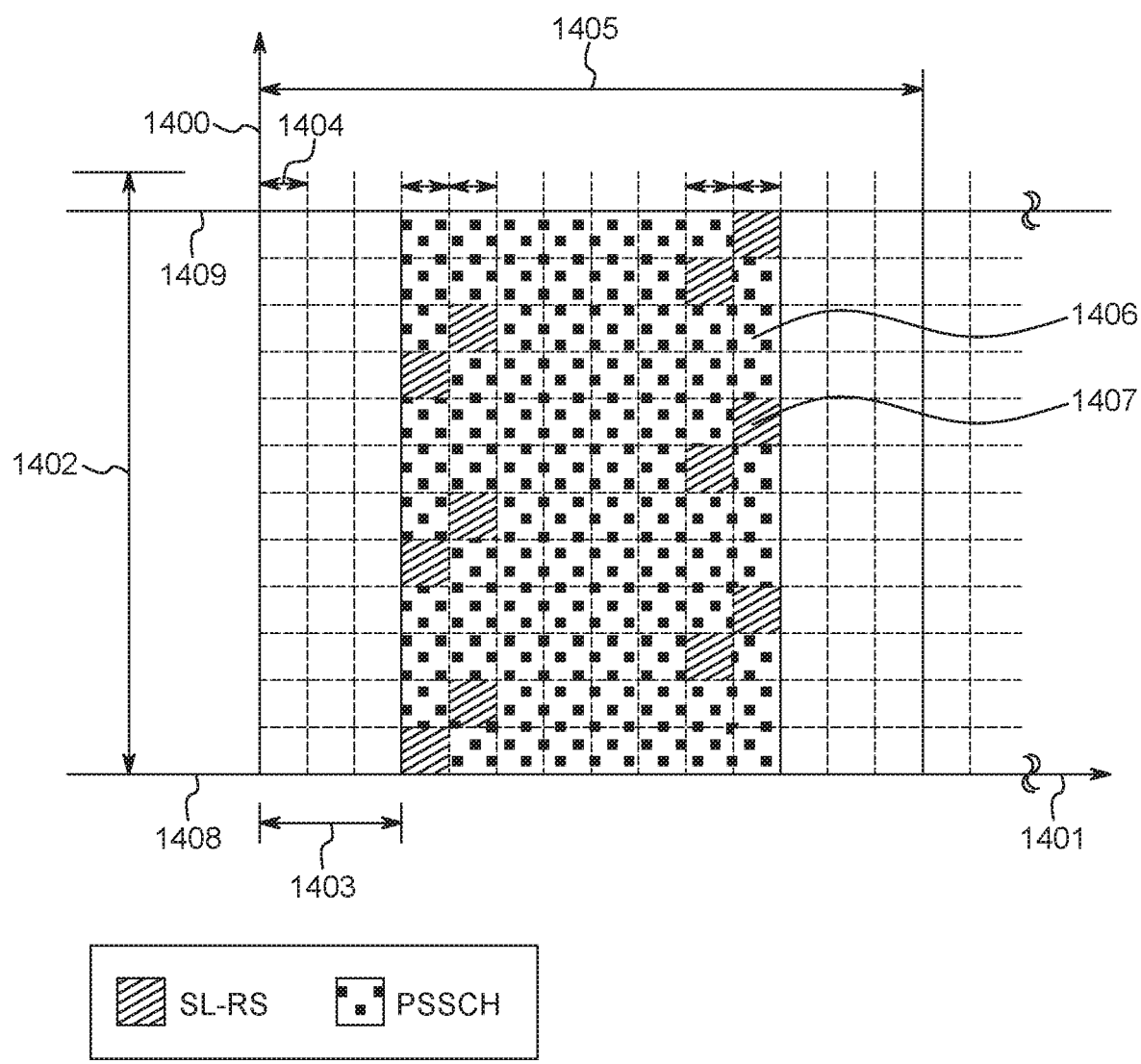
FIG. 14 shows a SL-RS that is multiplexing with PSSCH in time and frequency domain in accordance with an exemplary embodiment
Figure 15:
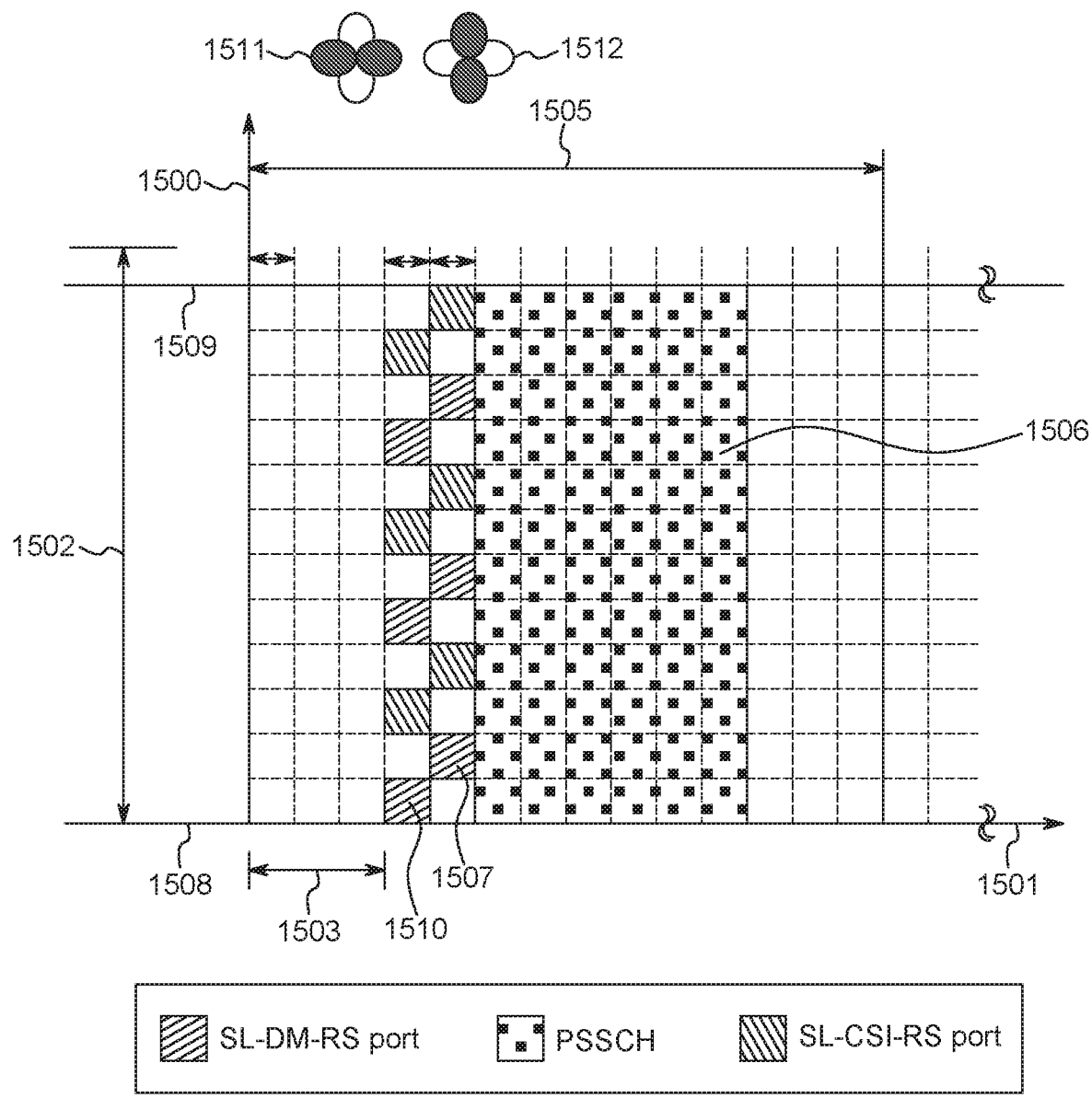
FIG. 15 shows a SL DM-RS port that can be reused for SL CSI-RS port to reduce overhead in accordance with an exemplary embodiment.

A V2X UE may assume SL DM-RS is not allowed to multiplex with SL PSSCH in FD as shown in FIG. 13. FIG. 13 shows an example of an SL-RS that is not multiplexing with PSSCH in time and frequency domain having frequency 1300 on a vertical axis and time 1301 on a horizontal axis. Within a frequency range SL-RB 1302, from RE0 1308 to RE11 1309, is a time slot I 1305 that includes symbol locations for SL-RS 1310 and PSSCH 1306. Also shown are symbol 0 period 1304 and symbol offset 1303. However, in some occasions, SL DM-RS can be allowed to multiplex with SL PSSCH in time and frequency domain as shown in FIG. 14. This is because V2X UE may not use all of the SL RS antenna ports for transmission. In this case, a V2X UE according to an embodiment may allow SL RS to be multiplexed with PSSCH transmission in the time- and frequency domain. The signaling of allowing multiplexing can be achieved using SCI. If two stages of SCI are used in V2X communication, then this multiplexing signaling can be placed at the 2-stage SCI. FIG. 14 shows an example of an SL-RS multiplexing with PSSCH in time and frequency domain having frequency 1400 on a vertical axis and time 1401 on a horizontal axis. Within a frequency range SL-RB 1402, from RE0 1408 to RE11 1409, is a time slot I 1405 that includes symbol locations for SL-RS 1407 and PSSCH 1406. Also shown are symbol 0 period 1404 and symbol offset 1403. FIG. 15 shows an example of in which an SL DM-RS port can be reused for SL CSI-RS port to save overhead. In the example of FIG. 15, frequency 1500 is on a vertical axis and time 1501 is on a horizontal axis. Within a frequency range SL-RB 1502, from RE0 1508 to RE11 1509, is a time slot I 1505 that includes symbol locations for SL-DM-RS port 1407, SL-CSI-RS port 1510, and PSSCH 1506. Also shown are symbol 0 period 1504, symbol offset 1503, possible modulation for SL-DM-RS port 1511, and possible modulation for SL-CSI-RS port 1512. SL-CSI Reporting For SL unicast or groupcast, SL-CSI-RS could be configured for periodic, semi-persistent, or aperiodic transmission. SL-CSI-RS is configured as a time-frequency resource set. Furthermore, all SL-CSI-RS within a semi-persistent resource set may be jointly activated/deactivated by PC5-MAC-CE command. Likewise, transmission of all SL-CSI-RS within an aperiodic resource set may be triggered by means of SCI. Similarly, a vehicle may be configured with SL-CSI-IM resource sets, each including a number of configured SL-CSI-IM that can be jointly activated/deactivated (semi-persistent SL-CSI-IM resource set) or triggered aperiodic SL-CSI-IM resource set.

Like NR Uu interface, QCL relations between a SL DM-RS port group according to an embodiment of this disclosure, which are the antenna ports used for PSSCH transmission, and the antenna ports used for SL-CSI-RS or SL-SSB transmission (if the UE transmit SL-SSB) can be configured. In SL, V2X UE can transmit SL-SSB based on synchronization with network, GNSS or when out-of-synchronization. Therefore, an embodiment of a V2X UE according to the disclosure can use SL CSI-RS as the default for SL CSI measurement when V2X UE is out-of-sync and the L1-RSRP quality of SL-SSB is under a threshold.

The TCI provided as part of the SCI scheduling assignment indicates the QCL relations to use which reception beam to use for PSSCH. The V2X UE can report measurements corresponding to up to number of X SL reference signals (either SL-CSI-RS or SL-SSBs), where number of X SL reference signals can be either indicated by PC5-MAC-CE (if semi-persistent SPS reporting) or SCI (aperiodical reporting). Each such report includes: the measured L1-RSRP of the strongest SL-CSI-RS and the remaining up to X−1 SL-CSI-RS: The difference between the measured SL L1-RSRP and the measured SL L1-RSRP of the best SL-CSI-RS. Disclosed embodiments further include the following methods to save/reduce SL CSI-RS resources:

SL DM-RS may be configured as one of SL CSI-RS port to save antenna port overhead, this can be done by using TCI to indicate which DM-RS is linked with SL CSI-RS, for example as shown in FIG. 5.

The number of SL-CSI-RS ports is limited to X ports. For example, number of activated SL CSI-RS ports can be used is equal to X. In general, for V2X communication, X is a small number, e.g. X=4 antenna ports.

If multiple SL DM-RS ports are configured for a SL transmission, then multiple DM-RS can be linked to a SL CSI-RS. Therefore, according to an embodiment, TCI can indicate more than one antenna ports for SL. SCI indicates which SL CSI-RS is QCLed with DM-RS.

In addition to being configured with SL CSI-RS, a device can be configured with one or several SL CSI-RS resource sets, officially referred to as SL NZP-CSI-RS-ResourceSets. Each such resource set includes one or several configured SL CSI-RS. The resource set can then be used as part of report configurations describing measurements, and corresponding report to be done by a device. Similarly, to Uu, SL NZP-CSI-RS-ResourceSet according to such an embodiment may include pointers to a set of SL SSB. This reflects the fact that some V2X UEs measurements, especially measurements related to beam management and mobility, may be carried out on either SL CSI-RS or SL SSB.

SL-RS with Multiple Panels

When a V2X UE is equipped with multi-panels for intra-band case, SL RS antenna ports can be reused depending on the following cases:

The maximum number of $N_s$ TCI states within a single slot, with fully/partial overlapped time-frequency resource of SL RS antenna ports The maximum number of $N_f$ TCI states within the single slot, with non-overlapped frequency resource allocation of SL RS antenna ports The maximum number of $N_t$ TCI states within the single slot, with overlapped time slot resource allocation of SL RS antenna ports For example, if $N_s$=2, then it can imply that a V2X UE according to an embodiment of the disclosure has at least two panels that are spatially orthogonal, which may occur when a vehicle mounts its two panels at the front and rear bumpers. In this example, V2X UE can transmit two SL RS antenna ports simultaneously in time-frequency domain.

Separated SL CSI reporting and reporting resources can be dependent on the capability parameters such as $N_s$, $N_f$ and $N_t$. For instance, if $N_f$=2, then a V2X UE according to an embodiment has at least two panels supported for transmission and reception in a same time-domain resource. However, the V2X UE may not be able to report the two SL CSI reporting in time at the same time-domain resource even the V2X UE is capable to do so. An embodiment according to this disclosure may use one or both of the following two methods: in the first method, a vehicle is allowed to defer one of the SL CSI reporting to a next available overlapped time domain resource. In the second method, joint CSI reporting is allowed for CSI reporting for a same V2X UE.

For V2X transmission mode 1, i.e., network, e.g. gNB, schedules the sidelink resources used by the V2X UE for sidelink transmission. In transmission mode 1, network can be dependent on V2X UE $N_s$, $N_f$, or $N_t$ capability/category to schedule SL RS resource set(s). For instance, network can schedule multiple SL RS resource sets if V2X UE is capable to do so. In transmission mode 2 (i.e., UE autonomous transmission mode), V2X UE determines the sidelink resources used for sidelink transmission configured by pre-configured sidelink resources. V2X UE $N_s$, $N_f$ or $N_t$ capability/category for SL RS can be exchanged during the V2X discovery procedure. Therefore, multiple SL RS resource set can be mapped to a same time-frequency resource. A SL RS resource set can contain multiple SL RS port patterns and antenna ports.

SL Positioning RS (SL PRS)

Figure 16:
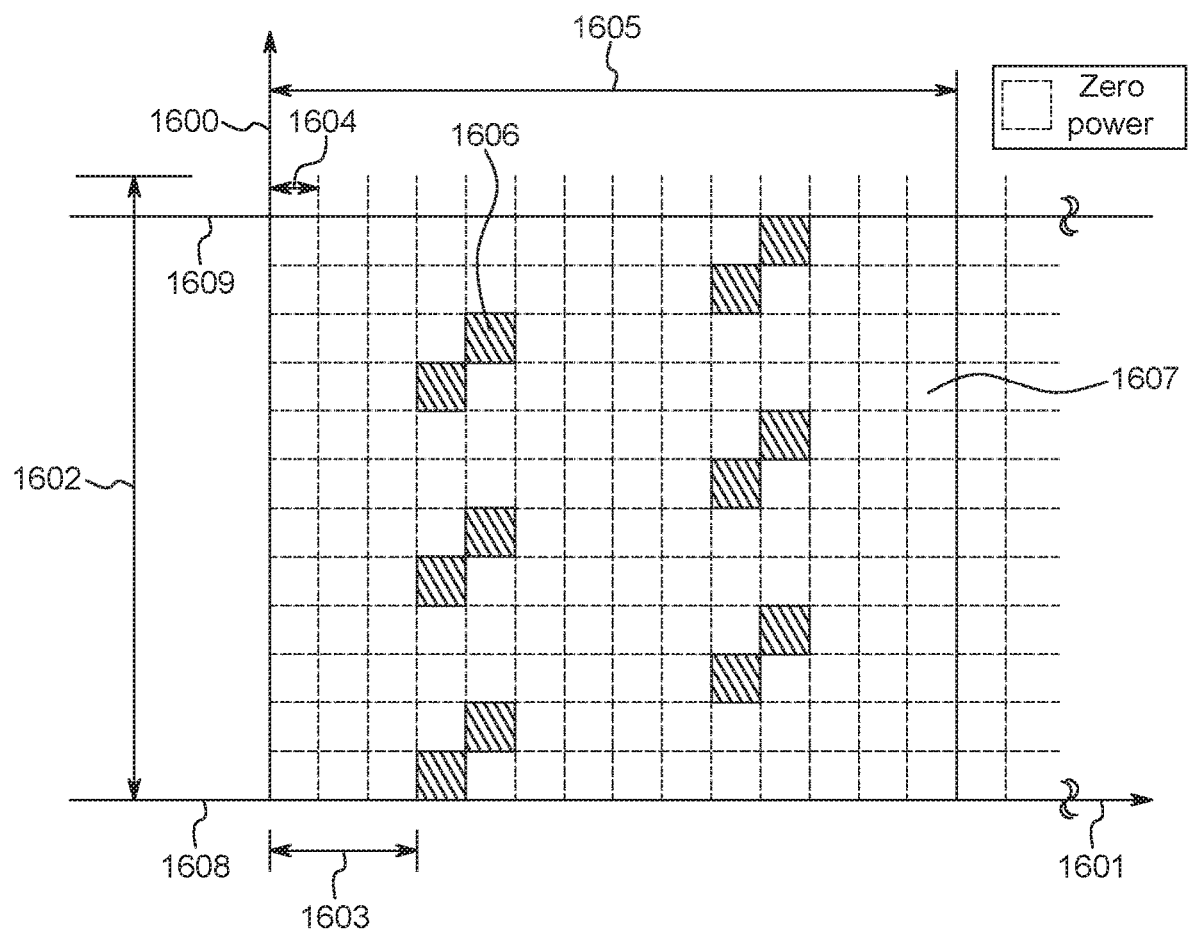
FIG. 16 shows a SL PRS pattern for which time-frequency multiplexing with PSSCH is not allowed in accordance with an exemplary embodiment.

An embodiment according to the claimed invention supports SL PRS, which can be used for relative position estimation which it is beneficial for many use cases in V2X communication such as maintaining the orthogonality among V2X UE2s and fast beam management (in which a vehicle can use the relative position to form the beam). A V2X UE according to a disclosed embodiment is informed about the SL PRS configuration and when the to-be-measured PRS signals are expected to arrive at the UE. SL PRS can use either SL CSI-RS resources or SL DM-RS resources (because SL DM-RS antenna port resources are counted as part of the SL RS resource). Furthermore, depending upon the V2X UE capabilities, an embodiment of the disclosed V2X UE can support performing multiple measurements of SL PRSs from different V2X UEs to report the relative timing difference (or RSTD) of different V2X UEs or other parameters. To achieve better position estimation performance, SL PRS may not be allowed to multiplex with PSSCH, for example as shown in FIG. 16. In the example of FIG. 16, frequency 1600 is on a vertical axis and time 1601 is on a horizontal axis. Within a frequency range SL-RB 1602, from RE0 1608 to RE11 1609, is a time slot I 1605 that includes symbol locations for SL-PRS 1606 and zero power 1607. Also shown are symbol 0 period 1604 and symbol offset 1603.

SL Timing Tracking RS

Figure 17:
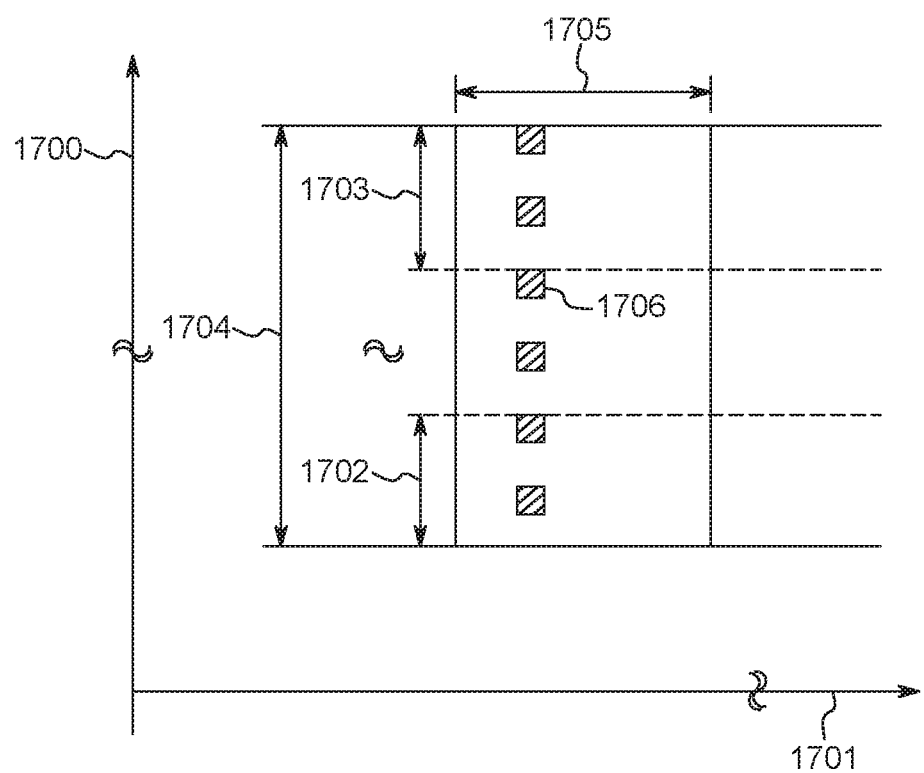
FIG. 17 shows wideband SL DM-RS and SL-CSI-RS antenna ports for SL TRS in accordance with an exemplary embodiment.
Figure 18:
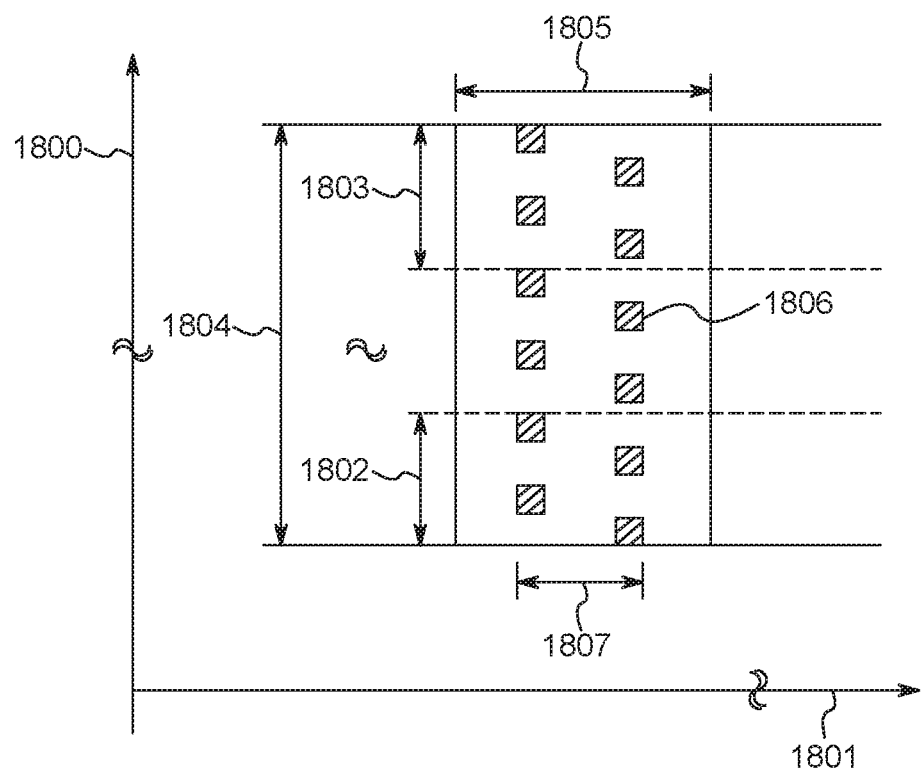
FIG. 18 shows time-domain symbol separation of SL DM-RS used for SL TRS in accordance with an exemplary embodiment.

According to a disclosed embodiment, a SL tracking reference signal (SL TRS) is configured. The SL TRS is a resource set consisting of multiple periodic SL CSI-RS or SL DM-RS to save signal overhead. When SL DM-RS is used for SL TRS, it can be based on wideband RS as shown in FIG. 17. More specifically a SL TRS consists of X antenna ports (e.g., X≤4), density-Z (Z can be equal to 3 or 4) SL CSI-RS or SL DM-RS located within two consecutive slots. If SL TRS is configured within the SL CRS-RS resource set, SL TRS can be configured with a periodicity of 10, 20, 40, or 80 ms or can be aperiodically transmitted with multiple time slots. The exact set of resources used for the SL TRS can be reused from SL CSI-RS. That is, SL TRS resource (or resource set) can use SL CSI-RS resource (or resource set) to save the SL RS resource (set) overhead. For instance, SL CSI-RS antenna resource (i.e., port, pattern) can be configured to SL TRS. According to the example of FIG. 17, including wideband SL DM-RS and SL-CSI-RS antenna ports for SL TRS, frequency 1700 is shown on a vertical axis and time 1701 is shown on a horizontal axis. A frequency range SL-BWP 1704 includes RB/Sub-channel 0 1702 to RB/Subch K-1 1703. Within a time slot 1705 arranged along the frequency domain at a same time are SL-RS port x 1706. According to the example of FIG. 18, including time-domain symbol separation of SL DM-RS used for SL TRS, frequency 1800 is shown on a vertical axis and time 1801 is shown on a horizontal axis. A frequency range SL-BWP 1804 includes RB/Subch 0 1802 to RB/Subch K-1 1803. Within a time slot 1805 arranged along the frequency domain in at least two different times separated by symbol separation time 1807 are SL-RS port x 1806.

According to an embodiment, there is always at least four-symbol time-domain separation between the two SL TRS within a slot. This can be achieved by two ways: first, if SL DM-RS is used for SL TRS then it can be achieved by inserting an additional SL DM-RS. Second, if SL CSI-RS is used for SL TRS then SL CSI-RS antenna ports can be designed with symbols separation. For example, according to an embodiment, SL CSI-RS port 1000 and SL CSI-RS port 2000 may be time-domain separated with 4 symbols in a slot. Therefore, the time domain separation sets can be used for the frequency error that can be tracked. Some of SL DM-RS and SL CSI-RS antenna ports, e.g. ports 0 to 3 can be configured as wideband SL RS, i.e., SL RS spans the whole SL BWP. FIG. 17 shows an exemplary wideband SL RS configuration pattern.

Timing Offset for SL Transmission

Figure 19A:
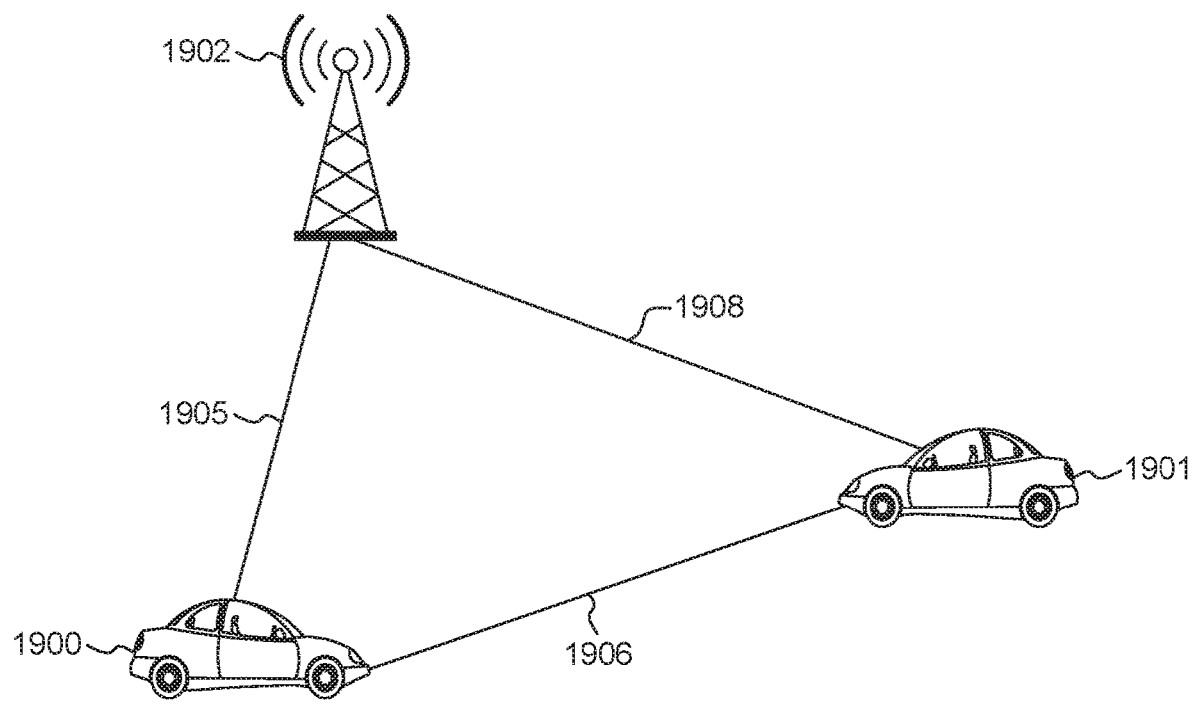
FIG. 19A shows network assisted SL between vehicle A and B in accordance with an exemplary embodiment.
Figure 19B:
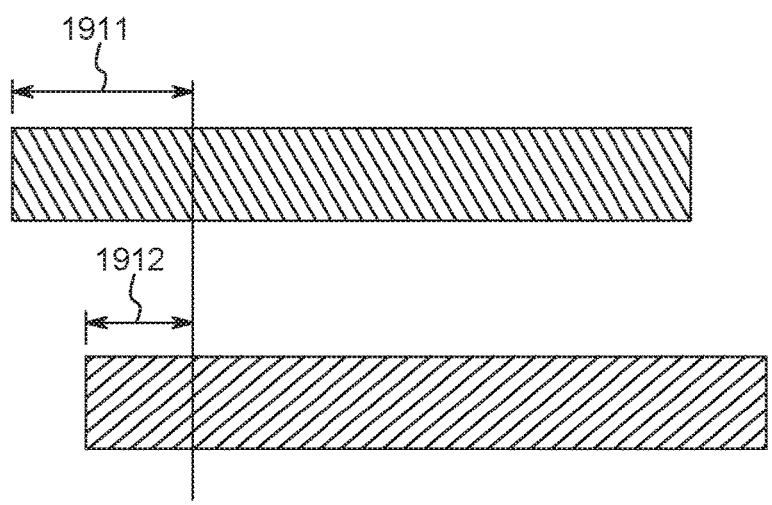
FIG. 19B shows network timing advance between vehicles A and B in accordance with an exemplary embodiment.
Figure 19C:
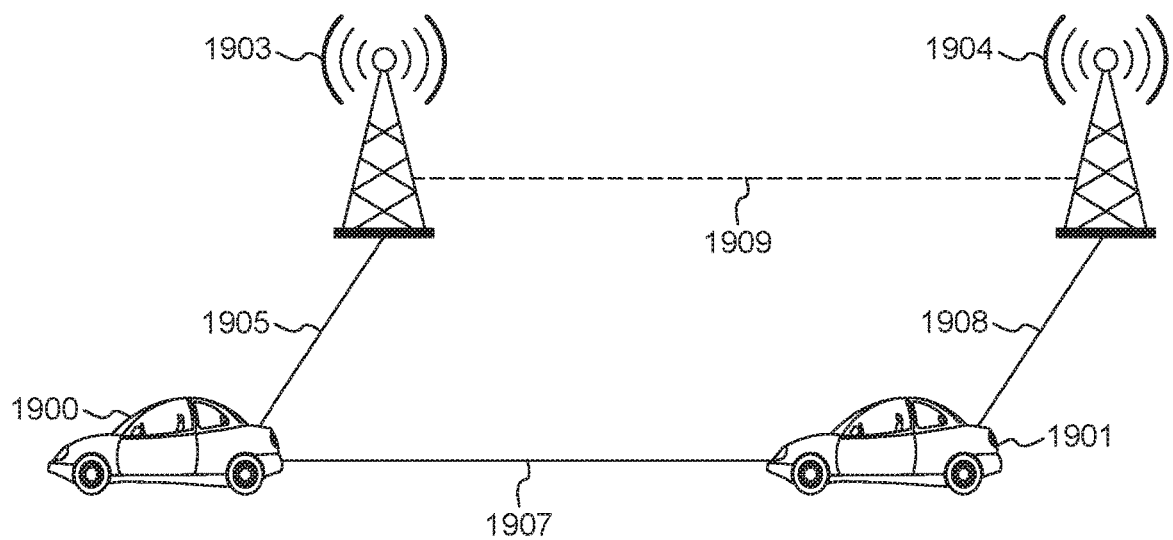
FIG. 19C shows network assisted SL between vehicle A and B in different gNBs in accordance with an exemplary embodiment.

According to embodiments of the disclosure, a network-assisted V2X scenario shown in FIGS. 19A and 19C, vehicle A 1900 and vehicle B 1901 may synchronize with a same gNB 1902 or different cells gNB 1903 and 1904, to achieve perfect synchronization of the signals arriving at the gNB. Different timing advance (TA) values TA1 and TA2 may be applied for different vehicles A 1900 and B 1901 to synchronize with the network. However, vehicles/UEs may transmit data among each other via SL if needed. Under such conditions, time-aligning each vehicle before the transmission begins can be unacceptable because of the increment in latency incurred by the synchronization mechanism that should be executed the cyclic-prefix (CP) before each transmission. In the example of FIG. 19A, vehicle A 1900 and vehicle B 1901 communicate via network assisted V2V 1906 with d12=d1−d2, while vehicle A 1900 communicates with the gNB 1902 via Uu with TA1, d1 1905, and vehicle B 1901 communicates with the gNB 1902 via Uu with TA2, d2 1908. In the scenario depicted in FIG. 19B, for example, if vehicle A 1900 and vehicle B 1901 do not modify their TA, then the timing offset (TO) experienced at vehicle B with respect to that of vehicle A during SL communication 1907 is the difference between their TA (i.e., TA$_1$−TA$_2$) plus the additional timing offset term introduced by the distance between vehicle A and B, namely, $$d_{12} = \frac{d_1 - d_2}{C},$$

where d$_1$ is the absolute distance (or equivalent to its absolute position) between vehicle A and the gNB, where d$_2$ is the absolute distance between vehicle B and the gNB and c is the light speed. As shown in FIG. 19C, the gNBs 1903 and 1904 may communicate with one another over an Xn interface, for example.

Thus, to maintain ISI free for the SL between vehicle A and B, an embodiment includes the following methods for SL timing offset:

Each vehicle uses the TA for the sidelink communications. The gNB controls the TAs of the vehicles such as to keep TOs on SL within constraints.

gNB performs the position estimation for V2X UE A and B to calculate the relative distance d$_{12}$ between vehicle A and B. If V2X UE A and B are with different gNBs then the position information can be exchanged between the gNBs. Hence, the gNB(s) can calculate the absolute distance between V2X UE A and B gNB sends timing offset via Uu MAC-CE interface to the vehicle A or B to adjust the SL transmission timing. This is useful when V2X UE has to support larger coverage such as in FR1 SL.

When V2X UE is in autonomous V2X communication mode, i.e., without network assisted case (mode 2), an embodiment according to the disclosure is described as follows. The ISI-free is maintained by estimation of the distance of the V2X UE in the unicast or groupcast. The distance estimation is achieved by exchanging the GNSS location in the PC5-MAC-CE message which it is carried by PSSCH. If V2X UEs are synchronized with GNSS, the GPS location is available for distance estimation. The V2X UE position estimation can be based on demand, i.e., it can be aperiodically, or periodically requested.

Figure 20:
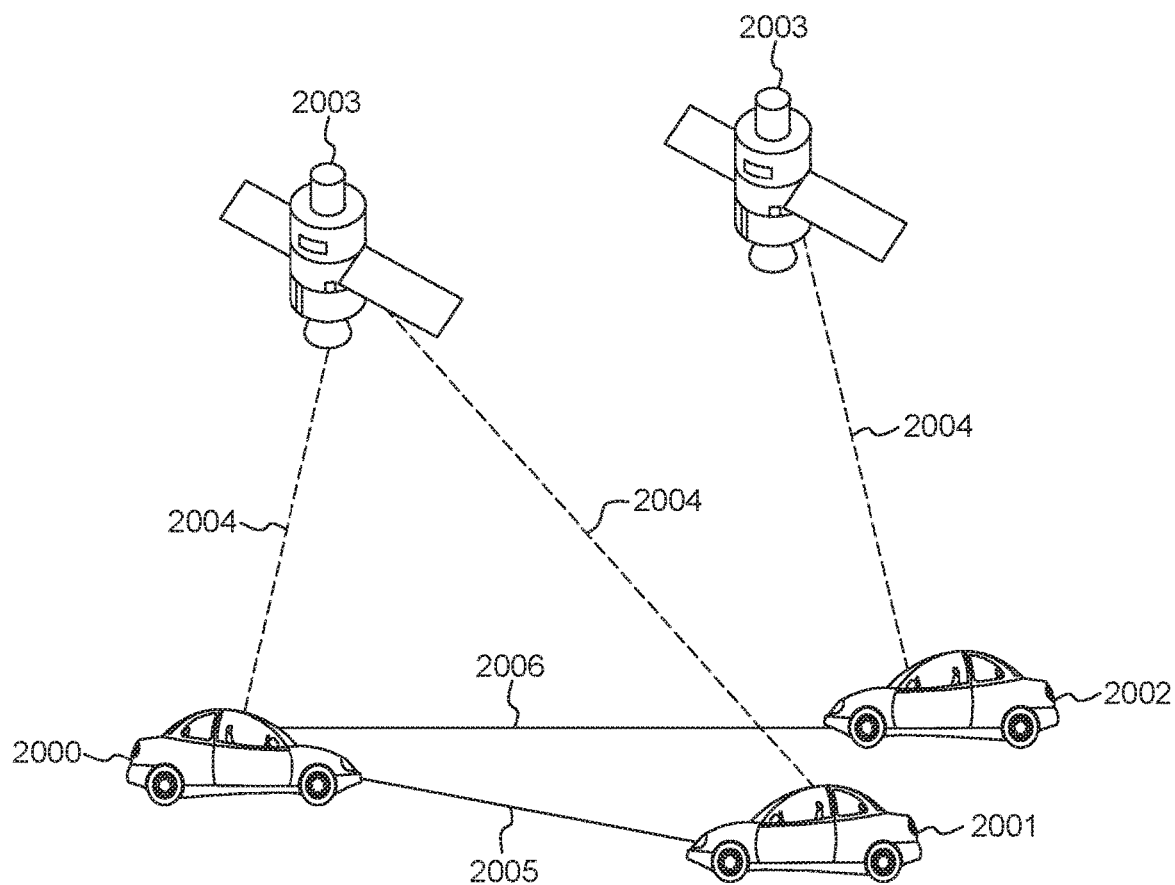
FIG. 20 shows timing offset between vehicles A, B, and C when those vehicles are in synchronization with GNSS in accordance with an exemplary embodiment.

The distance estimation method employed depends on UE implementation. For instance, the distances between two vehicles' GPS points can be calculated by using Pythagorean distance function. The timing offset (round-trip time) between V2X UE A and V2X UE B is equal to $$\frac{2d_{AB}}{C},$$

where d$_{AB}$ is the distance between the vehicle A 2000 and vehicle B 2001 as shown in FIG. 20. There is no need to signal the timing offset in the PC5 MAC-CE message for this case. Once the vehicle obtains the position provided from GNSS, V2X UE can calculate or estimate the distance between each other and perform the autonomous transmission timing adjustment to ensure the orthogonality among V2X UEs when those V2X UEs are under synchronization with GNSS. The GPS location may be signaled with PC5 MAC-CE messaging. As further illustrated by FIG. 20, vehicles A 2000, B 2001 and C 2002 each obtain position information using the GNSS 2003 via signals 2004. The timing offset between vehicle A 2000 and vehicle B 2001 is 2d$_{AB}$/C 2005 and the timing offset between vehicle A 2000 and vehicle C 2002 is 2d$_{AC}$/C 2006.

For the case when V2X UE is not synchronized with any system such as gNB or GNSS, it is more difficult to maintain ISI-free communication among non-synchronized V2X UEs because there is no common timing. Therefore, a V2X UE according to an embodiment can utilize an on-board sensor such as radar, LIDAR or others RAN-independent method to estimate other UE's relative distance, position or location. In this case, V2X UE can use the estimated distance to decide whether to admit other V2X UEs for communication. Therefore, the ISI-free can be maintained because all non-synchronized V2X UE won't be admitted if the distance is out of scope.

SL Beam Management

In NR Uu, beam management can be divided into different parts: 1) initial beam establishment; 2) beam adjustment, primarily to compensate for movements and rotations of the mobile device, but also for gradual changes in the environment; and 3) beam recovery to handle the situation when rapid changes in the environment disrupt the current beam pair. However, it may not be good to adopt the same Uu beam management for SL beam management. For example, for SL groupcast, if all V2X UEs within a same group must report its SL-CSI-RS then the reporting of SL L1-RSRP may cause too much signal overhead. Instead, to remedy this issue and utilize of the SL channel reciprocity, an embodiment according to the present disclosure includes the following methods for SL beam management.

Step 1: If a V2X UE transmits SL SSB and discovery message as shown in FIG. 7, then the monitoring V2X UE can calculate the best weight for the beam correspondence on the SL DM-RS for the feedback message. V2X UE can assume SL SSB and announcer's SL DM-RS for the discovery message are QCL. Then, the monitoring UE can derive the best weight for beamforming on the SL DM-RS for the feedback message. In this way, there is no need to configure the SL CSI-RS for full beam sweeping and save signal overhead.

Step 2: Once the discovery procedure is completed, the V2X UE may obtain the position of other discovered vehicles (UEs). Or UE may obtain others UEs position by estimating the distance calculation. The V2X UE can be based on the received SL DM-RS on the feedback channel and/or position information from the discovered V2X UE to derive the potential beams with corresponding beam width to setup the SL CSI-RS. In this way, it can reduce the required beams for beam sweeping. The beamformed SL DM-RS can be based on deriving the received SL-SSBs as the initial beam pairing (if the UE transmit SL-SSBs). If the V2X UE position is not available during the discovery procedure then the V2X UE may use the on-board sensors (RAN-independent) such radar, LIDAR to estimate the relative position and direction for the beam selection for the SL CSI-RS. However, there is limitation to use radar or LIDAR. This is because those sensors cannot identify multiple proximity V2X UEs. Thus, even if the relative position can be estimated, it still cannot identify which target V2X UE is to be configured.

Figure 21A:
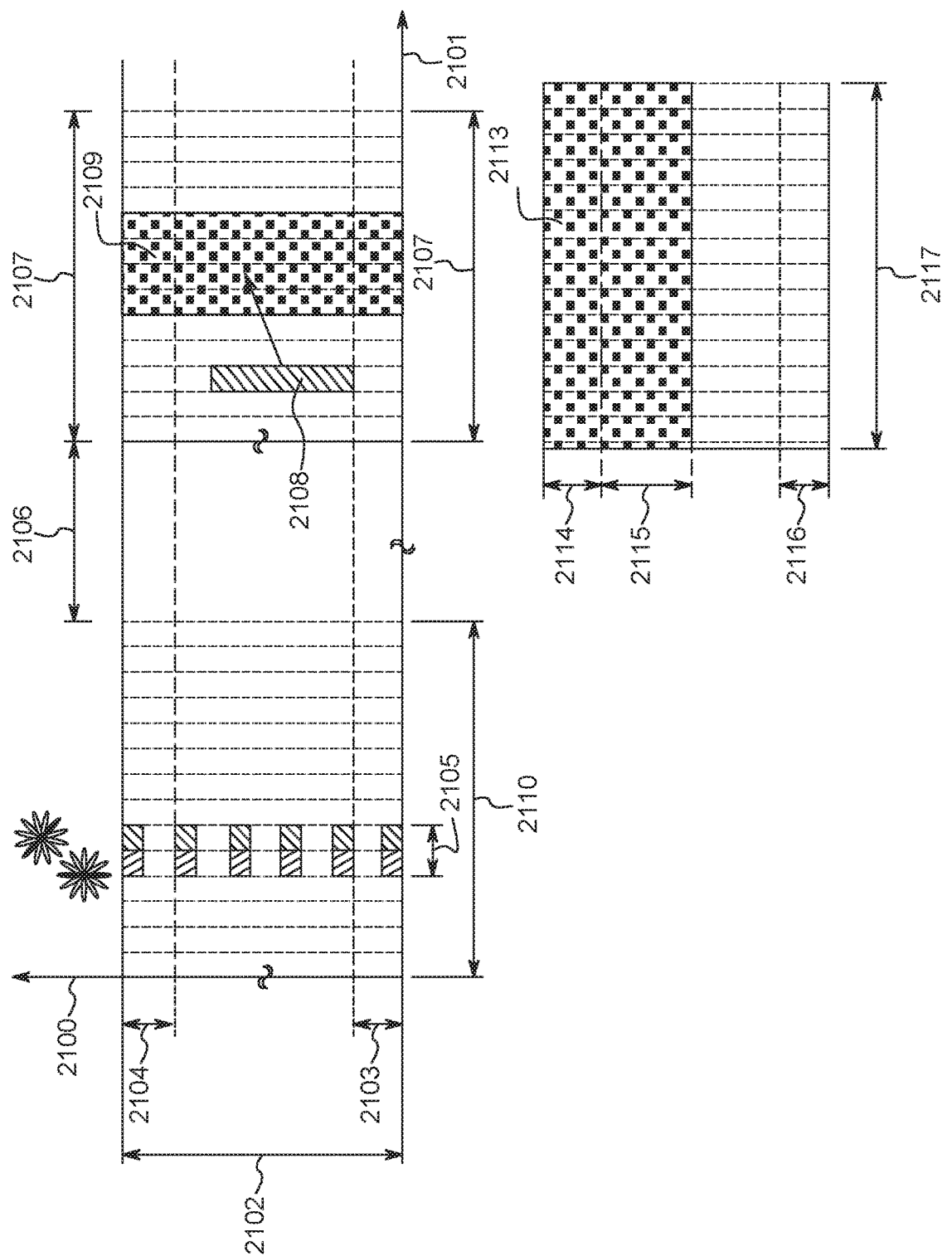
FIG. 21A shows a SL CSI reporting method with explicit reporting measured SL RSRP in accordance with an exemplary embodiment.

Step 3: V2X UE can trigger SL CSI-RS for beam sweeping and association. Note, from Step 2, the number of beams (or SL CSI-RS antenna ports) are minimized for SL CSI-RS reporting feedback. Therefore, the number of used for beam sweeping and association on SL CSI-RS antenna ports can be minimized. The feedback type of SL CSI-RS reporting can be configured in two distinct ways:

The first way includes the explicit reporting of the SL RSRP of SL CSI-RS 2105, occurring during time slot 2110, on the feedback slot 2107, occurring with feedback timing 2106 Δ slots later, as shown in FIG. 21A. The feedback slot 2107 occurs The V2X UE measures the SL RSRP from activated SL CSI-RS 2105 for beam association at next iteration, and the SL RSRP reports either on PSFCH (long format) 2113 or on PSSCH 2109 in response to SCI 2108 when there is multiple SL CSI-RS reporting. In the example of FIG. 21A, frequency 2100 is shown on a vertical axis and time 2101 is shown on a horizontal axis, a frequency range BWP1 2102 includes RB/RBG/Sub-channel 0 2103 to RB/RBG/Sub-channel k1 2104, or RB/Sub-channel 0 2116, RB/Sub-channel k1−1 2115, and RB/Subch k1 2114.

Figure 21B:
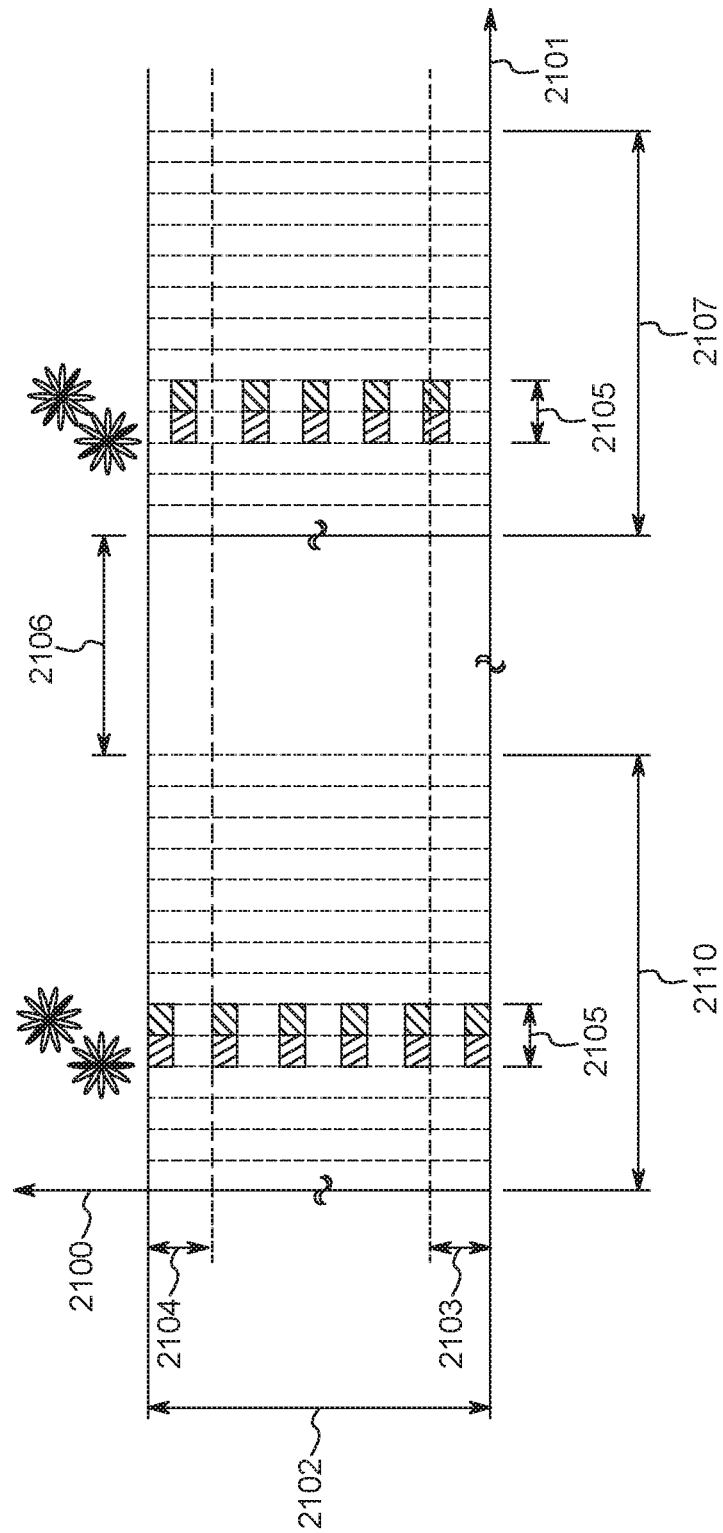
FIG. 21B shows a SL CSI reporting method with implicit transmission of SL CSI-RS on the feedback slot.

The second way includes implicitly transmit the SL CSI-RS on the feedback slot as shown in FIG. 21B. The SL CSI-RS resource (or resource set) information can be configured by PC5-RRC (i.e., SL higher layer signaling). In this method, the V2X UE monitors the received SL CSI-RS, and bases on the received SL CSI-RS signal property or quality such as the AoA/AoD and RSRP, etc. to derive the potential beams (or beam forming weight) for the feedback SL CSI-RS slots. The beamforming weight for the feedback SL CSI-RS is dependent on V2X UE implementation. This method can allow V2X UE to have quick convergent on the beam pairing and association.

It will be understood that any of the methods and processes described herein may be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been described herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

Abbreviations and Definitions

A/N Ack/Nack
BRS Beam Reference Signal
BWP Bandwidth Part
CE Control Element
CSI Channel State Information
DL Downlink
DM-RS DeModulation Reference signal
DRX Discontinuous Reception
eMBB enhanced Mobile Broadband
ETWS Earthquake and Tsunami Warning System
GNSS Global Navigation Satellite System
HARQ Hybrid Automatic Repeat Request
KPI Key Performance Indicators
LTE Long term Evolution
MAC Medium Access Control
MIB Master Information Block
mMTC massive Machine Type Communication
NACK Non-ACKnowledgement
NR New Radio
NR-PSDCH NR Physical Sidelink Discovery Channel
NR-PSSCH NR Physical Sidelink Shared Channel
NR-PSCCH NR Physical Sidelink Control Channel
PBCH Physical Broadcast Channel
PDCCH Physical Downlink Control Channel
PDSCH Physical Downlink Shared Data Channel
PRACH Physical Random Access Channel
PSDCH Physical Sidelink Discovery Channel
PSFCH Physical Sidelink Feedback Channel
PT-RS Phase Tracking Reference Signal
PRB Physical Resource Block
QCL Quasi Co-Location
RAN Radio Access Network
RAT Radio Access Technology
RNTI Radio Network Temporary Identifier
RSTD Reference Signal Timing Difference
RRC Radio Resource Control
RS Reference Signal
RSRP Reference Signal Received Power
SCI Sidelink Control Information
SI System Information
SIB System Information Block
SRS Sounding Reference Signal
SSB Synchronization Signal Block
TCI Transmission Configuration Index
TDD Time Division Duplex
TRS Timing Tracking Reference Signal
UE User Equipment
UL Uplink
URLLC Ultra-Reliable and Low Latency Communications
UU A Radio Interface Between UE and Base Station
V2X Vehicle-to-Everything

What is claimed is:

1. A first user equipment (UE) comprising:
a plurality of antenna panels each equipped with multiple antenna arrays;
at least one transceiver unit associated with each of the plurality of antenna panels; and
a processor configured to perform the first UE to:
perform a first multiple-physical sidelink shared data channel (PSSCH) and physical sidelink control channel (PSCCH) based Vehicle-to-Everything (V2X) sidelink (SL) radio communication with a second UE via a first band, using a first antenna panel of the plurality of antenna panels, wherein the first antenna panel is equipped with a first set of multiple antenna arrays, wherein the first antenna panel is independently configurable for the first multiple-PSSCH and PSCCH based V2X SL radio communication using a first communication resource, wherein the first communication resource is a first SL band or a first bandwidth part (BWP); and
perform a second multiple-PSSCH and PSCCH based V2X SL radio communication with a radio access network via a second band that is different from the first band, using a second antenna panel of the plurality of antenna panels that is different from the first antenna panel, wherein the second antenna panel is equipped with a second set of multiple antenna arrays, wherein the the second antenna panel is independently configurable for the second multiple-PSSCH and PSCCH based V2X SL radio communication using a second communication resource, wherein the second communication resource is a second SL band or a second bandwidth part (BWP).

2. The first UE of claim 1, wherein the communication with the second UE is performed in full duplex.

3. The first UE of claim 1, wherein the first BWP and the second BWP are each configured via a maximum number of SL higher layer configuration parameters for transmission configuration index (TCI) states within a single slot with fully overlapped or partial overlapped time-frequency resource allocation.

4. The first UE of claim 1, wherein the first BWP and the second BWP are each configured via a maximum number of SL higher layer configuration parameters for TCI states within a single slot with non-overlapped time-frequency resource allocation.

5. The first UE of claim 1, wherein the first BWP and the second BWP are each configured via a maximum number of SL higher layer configuration parameters for TCI states within a single slot with overlapped time resource allocation.

6. A method of operating a first user equipment, UE, the method comprising:
performing a first multiple-physical sidelink shared data channel (PSSCH) and physical sidelink control channel (PSCCH) based Vehicle-to-Everything (V2X) sidelink (SL) radio communication with a second UE via a first band using a first antenna panel of a plurality of antenna panels of the first UE, wherein the first antenna panel is equipped with a first set of multiple antenna arrays, wherein the first antenna panel is independently configurable for the first multiple-PSSCH and PSCCH based V2X SL radio communication using a first communication resource, wherein the first communication resource is a first SL band or a first bandwidth part (BWP); and
performing a second multiple-PSSCH and PSCCH based V2X SL radio communication with a radio access network via a second band that is different from the first band, using a second antenna panel of the plurality of antenna panels that is different from the first antenna panel, wherein the second antenna panel is equipped with a second set of multiple antenna arrays, wherein the second antenna panel is independently configurable for the second multiple-PSSCH and PSCCH based V2X SL radio communication using a second communication resource, wherein the second communication resource is a second SL band or a second bandwidth part (BWP);

and at least one transceiver unit of the first UE is associated with each of the plurality of antenna panels.

7. The method of claim 6, wherein the communication with the second UE is performed in full duplex.

8. The method of claim 6, wherein the first BWP and the second BWP are each configured via a maximum number of SL higher layer configuration parameters for transmission configuration index (TCI) states within a single slot with fully overlapped or partial overlapped time-frequency resource allocation.

9. The method of claim 6, wherein the first BWP and the second BWP are each configured via a maximum number of SL higher layer configuration parameters for TCI states within a single slot with non-overlapped time-frequency resource allocation.

10. The method of claim 6, wherein the first BWP and the second BWP are each configured via a maximum number of SL higher layer configuration parameters for TCI states within a single slot with overlapped time resource allocation.

* * * * *